US007604452B2

(12) United States Patent  
Stone et al.

(10) Patent No.: US 7,604,452 B2  
(45) Date of Patent: Oct. 20, 2009

(54) CANTILEVERED PALLET POSITIONER WITH SAFETY DEVICES

(75) Inventors: Robert M. Stone, Oro Valley, AZ (US); Guy G. Cox, Rancho Cucamonga, CA (US)

(73) Assignee: Bishamon Industries Corporation, Ontario, CA (US)

( * ) Notice: Subject to any disclaimer, the term of this patent is extended or adjusted under 35 U.S.C. 154(b) by 1586 days.

(21) Appl. No.: 10/145,426

(22) Filed: May 14, 2002

(65) Prior Publication Data

US 2002/0127089 A1 Sep. 12, 2002

Related U.S. Application Data

(63) Continuation-in-part of application No. 09/780,297, filed on Feb. 9, 2001, now Pat. No. 6,537,017.

(51) Int. Cl.
*B66F 17/00* (2006.01)

(52) U.S. Cl. ............... 414/636; 414/638; 414/672; 414/674; 187/209; 187/272; 187/346; 187/390; 91/394

(58) Field of Classification Search ............ 414/672, 414/662, 674, 638, 636; 187/272, 346, 390; 187/209; 188/30, 60; 91/394

See application file for complete search history.

(56) References Cited

U.S. PATENT DOCUMENTS

| | | | | |
|---|---|---|---|---|
| 2,828,040 A | * | 3/1958 | Fitton et al. | 414/662 |
| 3,694,044 A | | 9/1972 | Cummings | 312/71 |
| 3,889,576 A | * | 6/1975 | Sheffer et al. | 91/394 |
| 4,392,771 A | * | 7/1983 | Smalley | 414/545 |
| 4,526,267 A | * | 7/1985 | Harding et al. | 198/409 |
| 4,764,075 A | | 8/1988 | Cox et al. | 414/99 |
| 5,147,170 A | | 9/1992 | Detrick | 414/492 |
| 5,189,388 A | * | 2/1993 | Mosley et al. | 340/309.7 |
| 5,217,090 A | | 6/1993 | Billington et al. | 187/25 |
| 5,299,906 A | | 4/1994 | Stone | 414/792.3 |
| 5,490,758 A | * | 2/1996 | Stone | 414/792.3 |
| 5,574,437 A | * | 11/1996 | Schwinn et al. | 340/679 |
| 5,588,506 A | * | 12/1996 | Born | 187/209 |
| 5,771,816 A | | 6/1998 | Zaguroli, Jr. | 108/147 |
| 5,782,602 A | | 7/1998 | Mehta et al. | 414/672 |
| 5,887,680 A | * | 3/1999 | Carson et al. | 187/240 |
| 5,934,414 A | | 8/1999 | Staczek | 187/269 |
| 5,975,246 A | | 11/1999 | Toschi | 187/275 |
| 5,993,146 A | | 11/1999 | Hallgren | 414/792.2 |

(Continued)

FOREIGN PATENT DOCUMENTS

FR 2594-815 A 8/1997

*Primary Examiner*—Michael S Lowe  
(74) *Attorney, Agent, or Firm*—Quarles & Brady LLP

(57) ABSTRACT

A pallet positioner includes a support frame that consists of a main upright structure with a pair of spaced, parallel outriggers extending horizontally at ground level. The distal ends of the outriggers are connected by a low-profile ramp. The upright structure includes a pair of vertical guide masts rigidly mounted on a horizontal base bracing the proximal ends of the outriggers. A pneumatically and hydraulically controlled, or electrically and hydraulically controlled, cantilevered carrier with a rotatable platform is mounted for vertical motion along the vertical guide masts. When the carrier travels downward, the carrier stops automatically at a level above the outriggers and must be manually restarted. A braking system under the platform prevents rotation thereof at ground level.

37 Claims, 24 Drawing Sheets

U.S. PATENT DOCUMENTS 5,999,087 A * 12/1999 Gunton .................... 340/309.5
6,112,858 A * 9/2000 Arnst ......................... 187/269
2002/0139271 A1 * 10/2002 Fischer et al. ............... 101/483

* cited by examiner

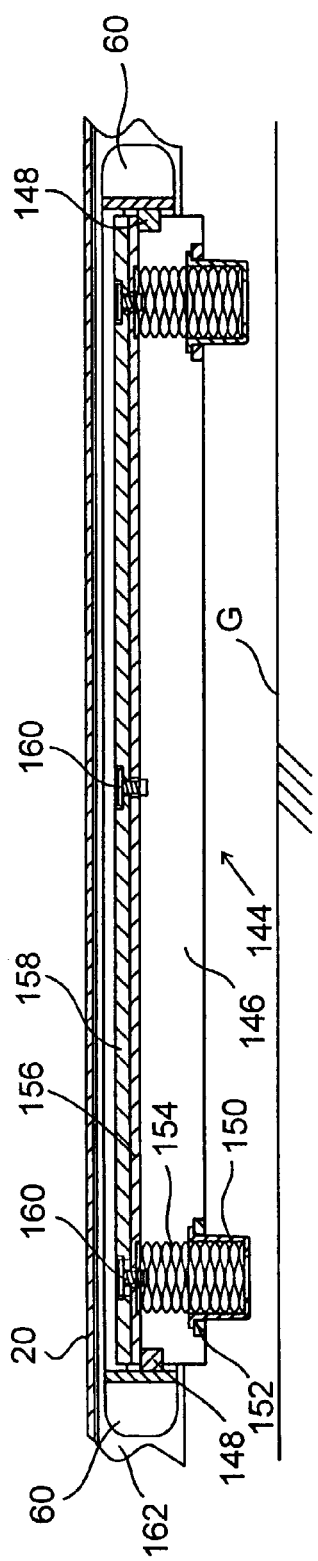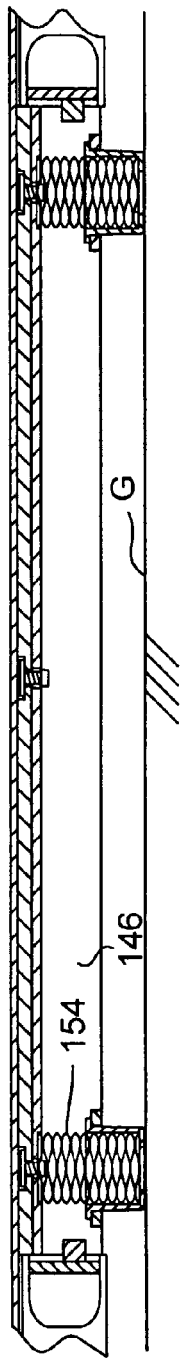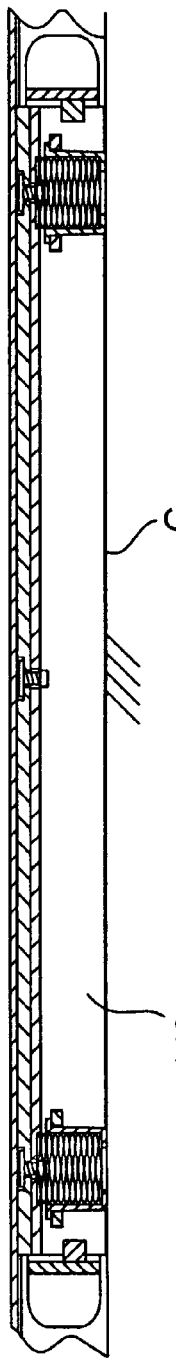

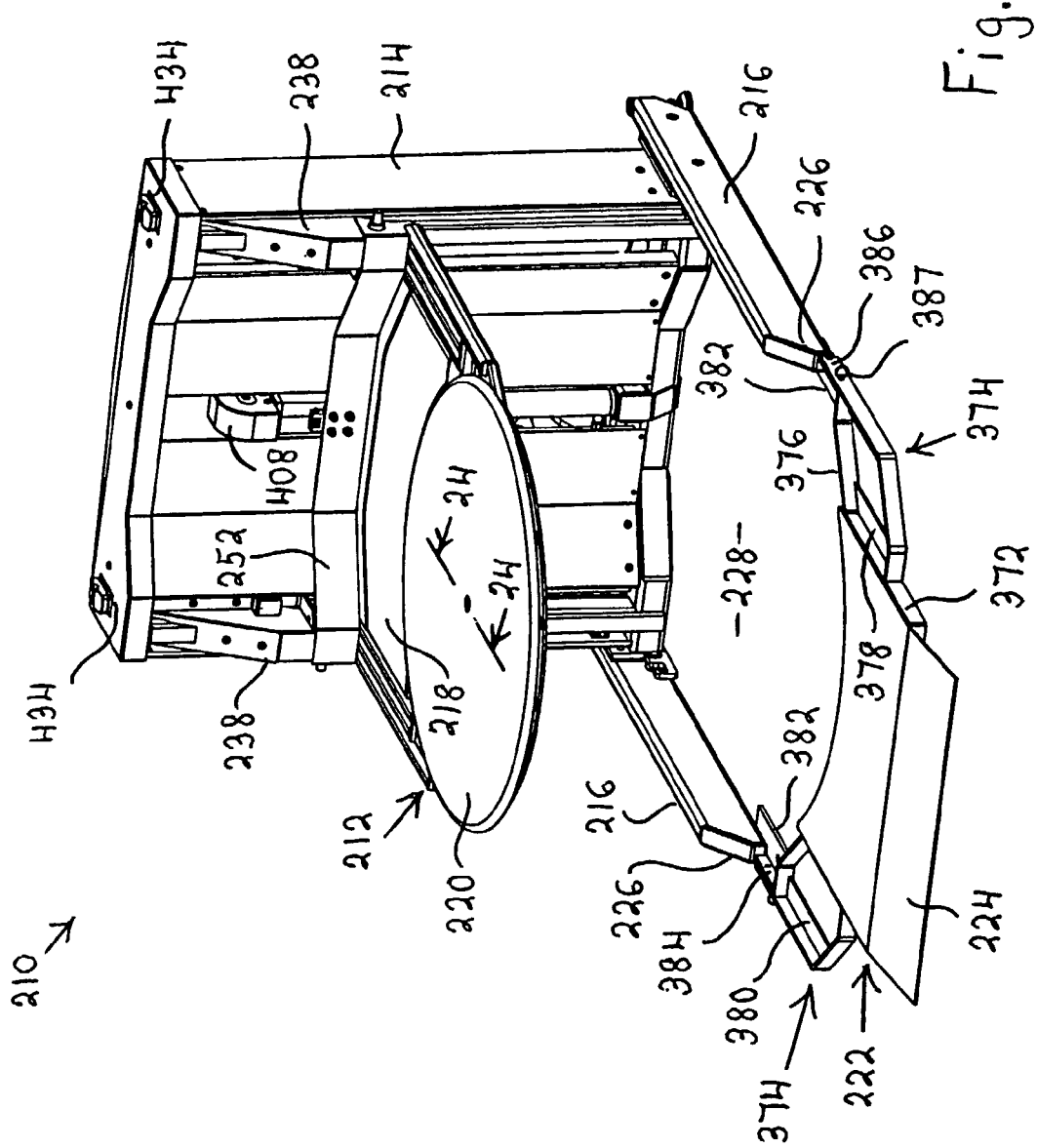

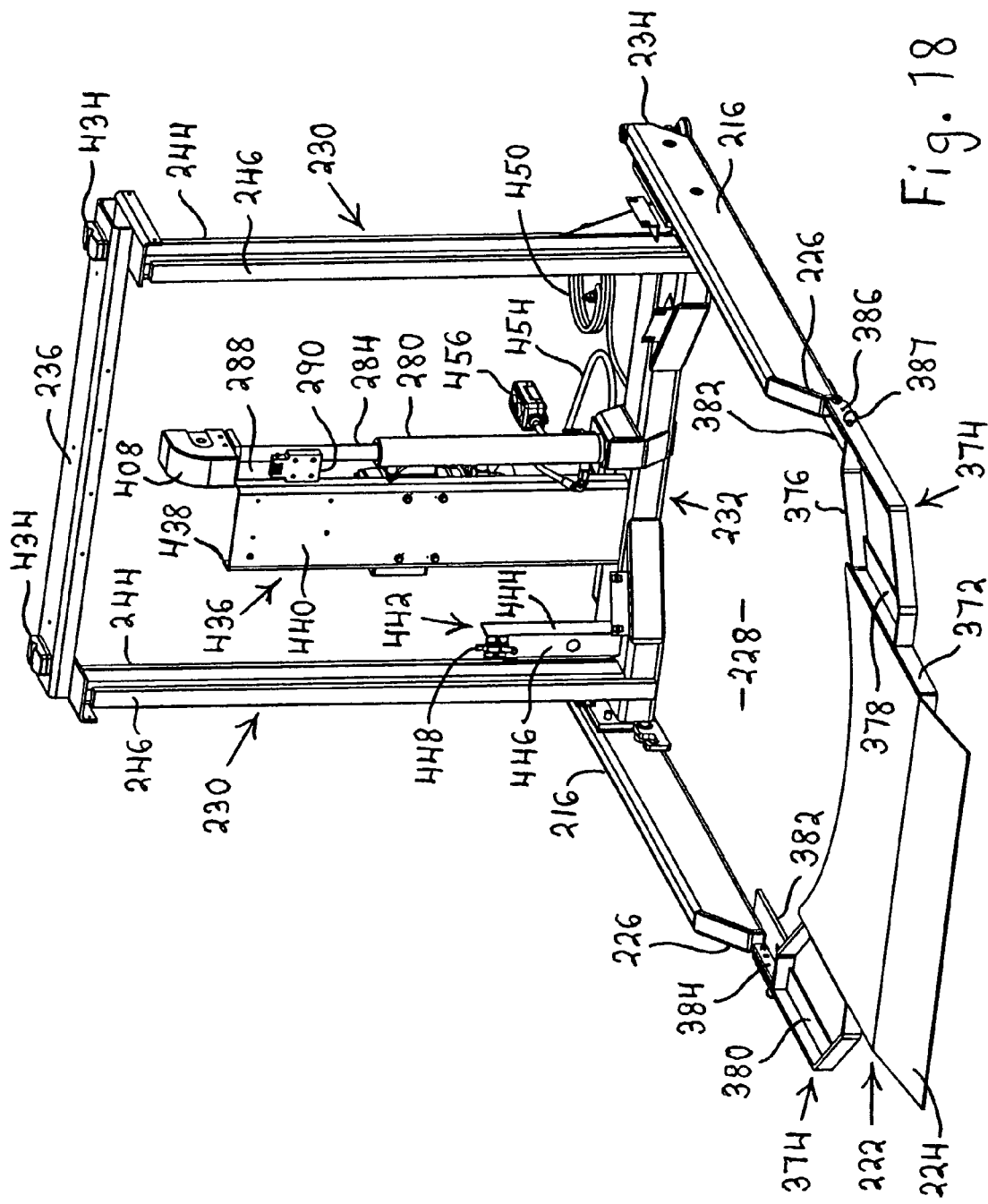

CANTILEVERED PALLET POSITIONER WITH SAFETY DEVICES

REFERENCE TO RELATED APPLICATION

This application is a continuation-in-part of application Ser. No. 09/780,297 filed Feb. 9, 2001 now U.S. Pat. No. 6,537,017 by Robert M. Stone for "Cantilevered, Self-Adjusting Pneumatic Pallet Positioner".

BACKGROUND OF THE INVENTION

1. Field of the Invention

The invention relates to a load positioner.

2. Description of the Prior Art

In the handling of a number of packages, boxes, or other objects, a common task is to manually transfer them between an elevated table, conveyor, shelf, or other location, and a pallet resting on the floor. While the shelf, for example, remains at a fixed height, the top of the load on the pallet, where the next box or object is to be placed or removed, usually is at a different height which varies as the packages, etc., are piled on or removed from the pallet. This difference in height, and the changes in this difference during loading or unloading of the packages, can be fatiguing for the person doing the moving. Therefore, pallet positioners, also known in the art as load elevators, have been developed for raising the pallet from the floor to a more convenient height and even for automatically adjusting the height of the pallet as the load increases or decreases, so that the preferred height of the top of the load is maintained.

U.S. Pat. No. 5,299,906 discloses a self-adjusting pallet positioner supported by a scissors linkage located under a rotatable load platform. The vertically expandable scissors linkage is coupled to an air-actuator chamber that includes a compressible bellows and a fixed-volume reservoir placed under the load platform. The bellows is compressible between specified maximum and minimum bellows heights which correspondingly determine substantially different maximum and minimum bellows volumes. The air reservoir is coupled to the bellows and has a fixed volume that is substantial compared to the difference between the maximum and minimum bellows volumes. As a result of this configuration, the pallet positioner exhibits very good self-leveling characteristics.

In the positioner's unloaded condition, the scissors linkage is extended and the platform is situated at a convenient level for loading packages and/or materials onto a pallet placed on the platform. As boxes or crates are stacked on the pallet and the weight and height of the stack on the pallet increase, the scissors linkage and the air bellows automatically contract under the load and the platform sinks approximately in proportion to the height increase of the stack for uniform loads. Thus, the top of the stack is maintained at a roughly constant level by the self-leveling feature and the stacking process is facilitated. The rotary design of the platform also helps ease the stacking process since the platform can be rotated to place boxes or crates next to one another as necessary.

When the pallet is fully loaded, it is removed from the platform with a fork lift. At this time, the platform is in its lowest position.

A low-profile pallet positioner which addresses these problems is disclosed in U.S. Pat. No. 5,782,602. The positioner of this patent consists of an upright housing and a pair of spaced, parallel outriggers extending from the housing. Vertical guide rods are mounted on the exterior of the housing and a cantilevered platform assembly with a rotatable platform is movable over the outriggers up and down along the guide rods. In its lowermost position, the platform assembly sits on the ground between the outriggers, thereby permitting the placement of a pallet truck under the pallet. The cantilevered platform assembly is driven by a cylinder-and-piston unit which is disposed inside the upright housing and engages the periphery of the assembly through a slot in a wall of the housing. The cylinder-and-piston unit is extended and retracted by a power unit consisting of a motor, pump and tank likewise disposed inside the housing, and the platform is raised and lowered as needed by the operation of the power unit.

Inasmuch as the platform is rotatable, care must be exercised in removing the pallet from the platform. Furthermore, if the operator of the pallet positioner is inattentive or distracted when the platform approaches its lowest position, the operator may position herself or himself with her or his feet below the platform. The operator's feet could then become trapped between the platform and the ground.

A strip-like conductor, extending along the top of each outrigger, is provided to prevent injury to the operator. In addition, if a pallet becomes misaligned as the platform descends, the pallet may strike one or both of the strip-like elements, thereby deactivating the power unit so that tipping of the pallet can be avoided.

Several vertical shafts are slidably mounted on the platform assembly below and circumferentially of the platform. The upper end of each shaft is provided with a layer of rubber or the like and, when the platform assembly is in a raised position, the rubber layers are separated from the platform by a gap. On the other hand, the lower ends of the shafts project below the platform assembly. As the platform assembly approaches its lowermost position, the lower ends of the shafts contact the ground thereby causing the shafts to move upwards relative to the platform. The rubber layers on the upper ends of the shafts then come into contact with the platform so that the platform is prevented from rotating. Although this braking system is generally satisfactory, there can be a loss in braking effectiveness if the rubber layers or the lower ends of the shafts undergo wear.

A photoelectric arrangement is provided at the ends of the outriggers remote from the housing. The photoelectric arrangement includes a photoelectric cell at the remote end of one outrigger and a light source at the remote end of the other outrigger. The light source directs a beam of light towards the photoelectric cell and, when the platform is traveling downward and the light beam is broken by an object placed in the path of the beam, the platform stops. This prevents the foot of an operator from becoming trapped beneath the platform if the operator should place her or his foot between the light source and the photoelectric cell. While this safety system operates well, it fails to protect an operator who places her or his foot below the platform at locations other than those between the remote ends of the outriggers.

SUMMARY OF THE INVENTION

It is an object of the invention to provide a load handling apparatus which allows safety to be increased.

The preceding object, as well as others which will become apparent as the description proceeds, are achieved by the invention.

One aspect of the invention resides in a load handling apparatus. The apparatus comprises support means including an upwardly and downwardly extending support structure, a platform assembly movable up-and-down on the support structure between an uppermost position and a lowermost position, and means for controlling movement of the platform assembly.

In one embodiment of the load handling apparatus, the controlling means comprises means for stopping downward movement of the platform assembly in response to arrival of the platform assembly at an intermediate position, i.e., at a position between the uppermost and lowermost positions.

The automatic stopping of the platform assembly during its descent will cause an operator to direct her or his attention to the platform assembly even if the operator has been distracted. Upon observing that the platform assembly is stopped, the operator is warned that the assembly is approaching its lowermost position and that she or he should stand clear of the assembly. The stopping of the platform assembly thus improves the safety of the above embodiment of the load handling apparatus according to the invention.

In another embodiment of the load handling apparatus of the invention, the platform assembly includes a rotatable platform and the apparatus comprises means for preventing rotation of the platform in the lowermost position of the assembly. The preventing means includes a retaining member for holding the platform against rotation and means for resiliently urging the retaining member towards the platform in the lowermost position of the platform assembly.

Resilient urging of the retaining member towards the platform makes it possible to compensate for wear so that the retaining member can brake the platform effectively even if the retaining member is worn away to some degree. This allows a load to be safely removed from the platform in spite of wear undergone by the retaining member.

An additional aspect of the invention resides in a method of handling a load.

One embodiment of the method comprises the steps of raising a platform from a lowermost position to an elevated position, placing a load on the platform while the platform is in the elevated position, and moving the platform from the elevated position towards the lowermost position. This embodiment of the method further comprises the step of interrupting the moving step in response to arrival of the platform at an intermediate position between the elevated position and the lowermost position.

Another embodiment of the method comprises the steps of raising a platform from a lowermost position to an elevated position, placing one part of a selected load on the platform while the platform is in the elevated position and rotating the platform. The present embodiment of the method further comprises the steps of placing another part of the selected load on the platform following the rotating step and returning the platform to its lowermost position. The instant embodiment of the method also comprises the step of preventing rotation of the platform while the platform is in its lowermost position using a retaining element designed to hold the platform against rotation. The preventing step includes resiliently urging the retaining element towards the platform.

Additional features and advantages of the invention will be forthcoming from the following detailed description of specific embodiments when read in conjunction with the accompanying drawings.

BRIEF DESCRIPTION OF THE DRAWINGS

FIGS. 15A-15C are fragmentary sectioned side views of the platform assembly of FIG. 14 illustrating the functioning of the brake mechanisms as the platform assembly approaches ground level.

FIG. 17 is a view similar to FIG. 1 of a pallet positioner in accordance with the invention having an electrically and hydraulically operated platform assembly with a rotatable platform.

FIG. 18 is a view similar to FIG. 3 of the pallet positioner of FIG. 17.

DESCRIPTION OF THE PREFERRED EMBODIMENTS

Figure 1:
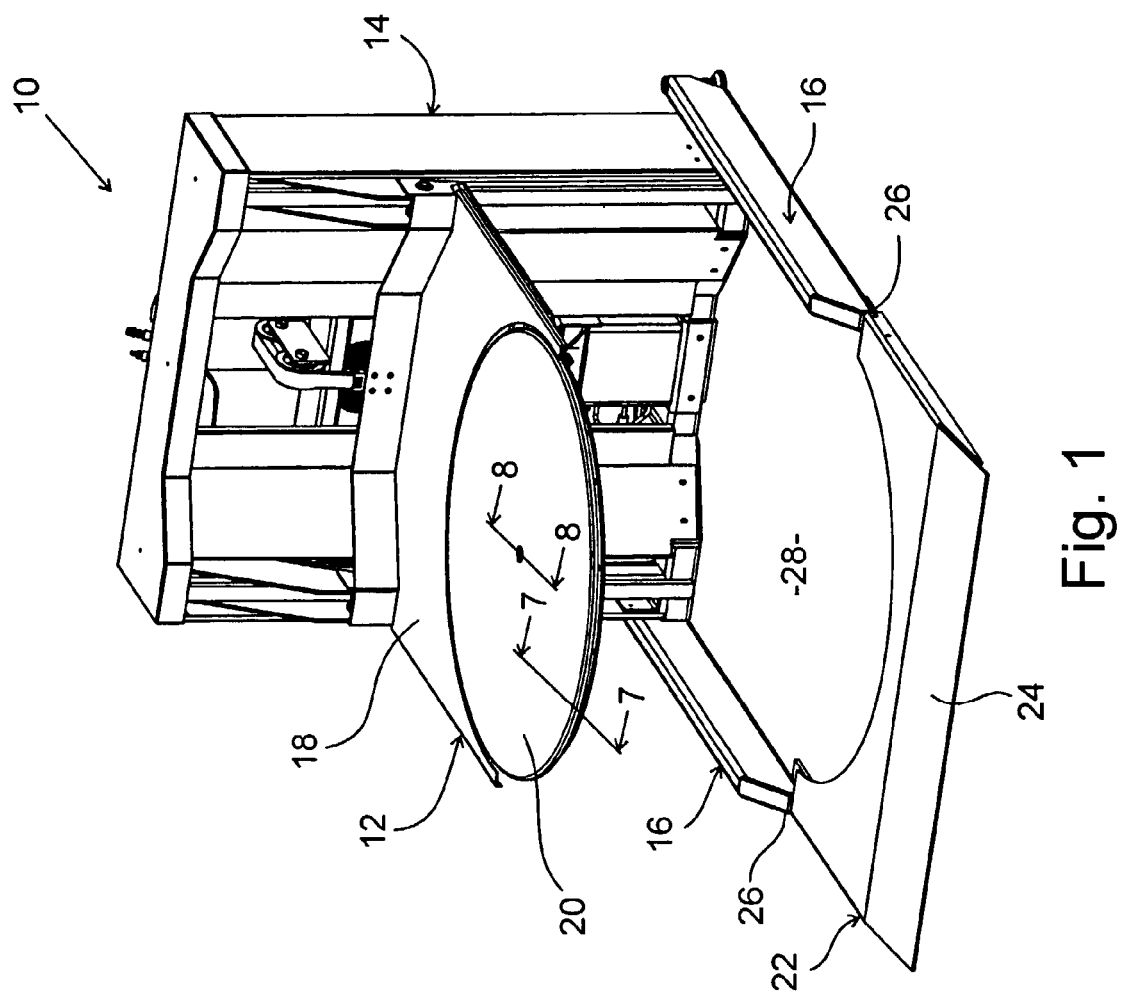
FIG. 1 is a front perspective view of a pallet positioner according to the invention having a pneumatically and hydraulically operated platform assembly with a rotatable platform.
Figure 2:
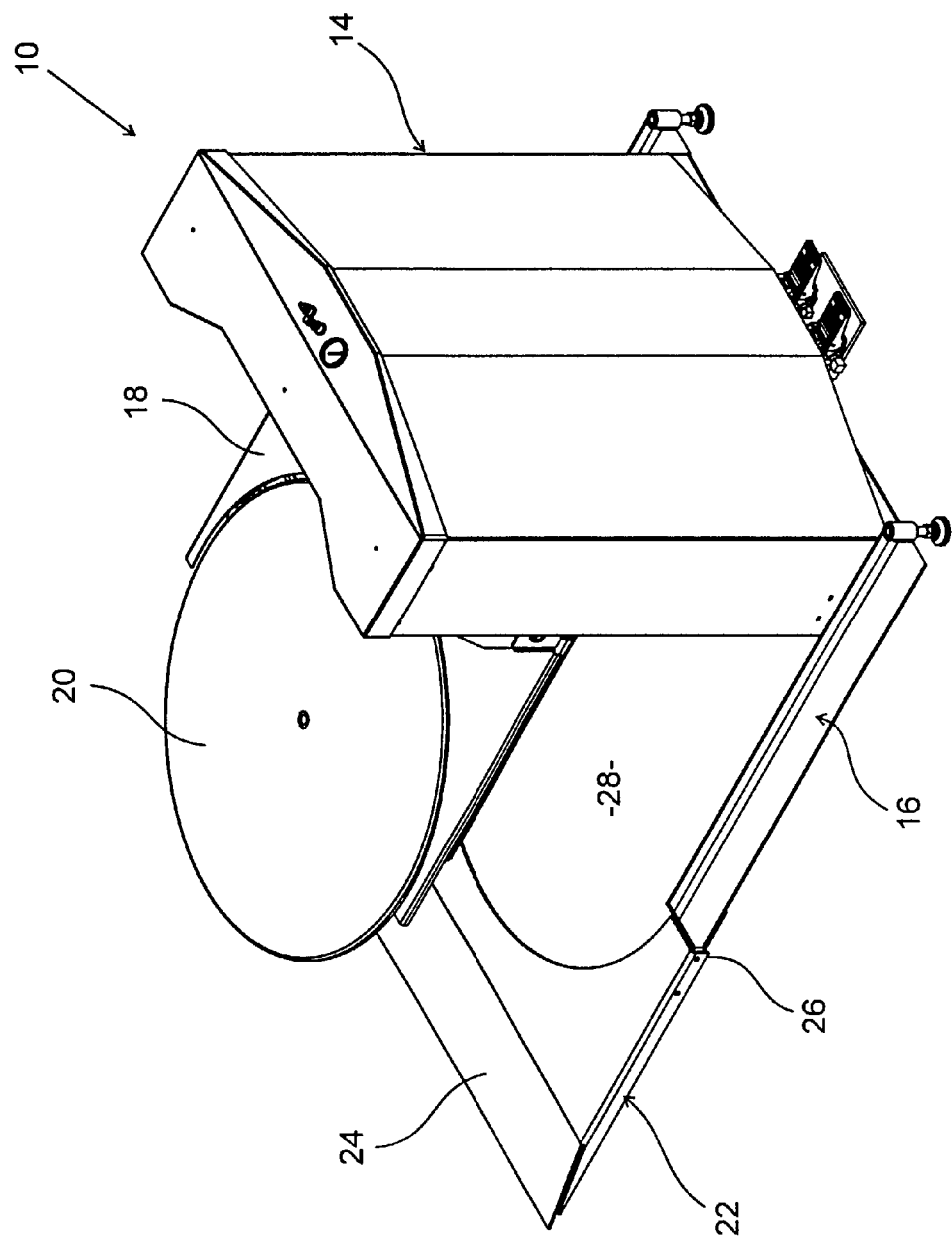
FIG. 2 is a rear perspective view of the pallet positioner of FIG. 1.

Referring to FIGS. 1 and 2, the numeral 10 identifies a pallet positioner or load handling apparatus 10 according to the invention. The positioner 10 includes a horizontal platform assembly 12 mounted in cantilevered arrangement on a vertical structure 14 that is supported by two parallel outriggers 16 extending at ground level from the structure 14. The platform assembly 12 includes a carrier 18 and a rotatable platform 20 mounted on the carrier 18. A low-profile flat ramp 22 with a beveled front lip 24 braces the distal ends 26 of the outriggers 16 and defines a ground-level space 28 designed to accommodate the carrier 18 and platform 20 when the assembly 12 is in its lowermost position.

Figure 3:
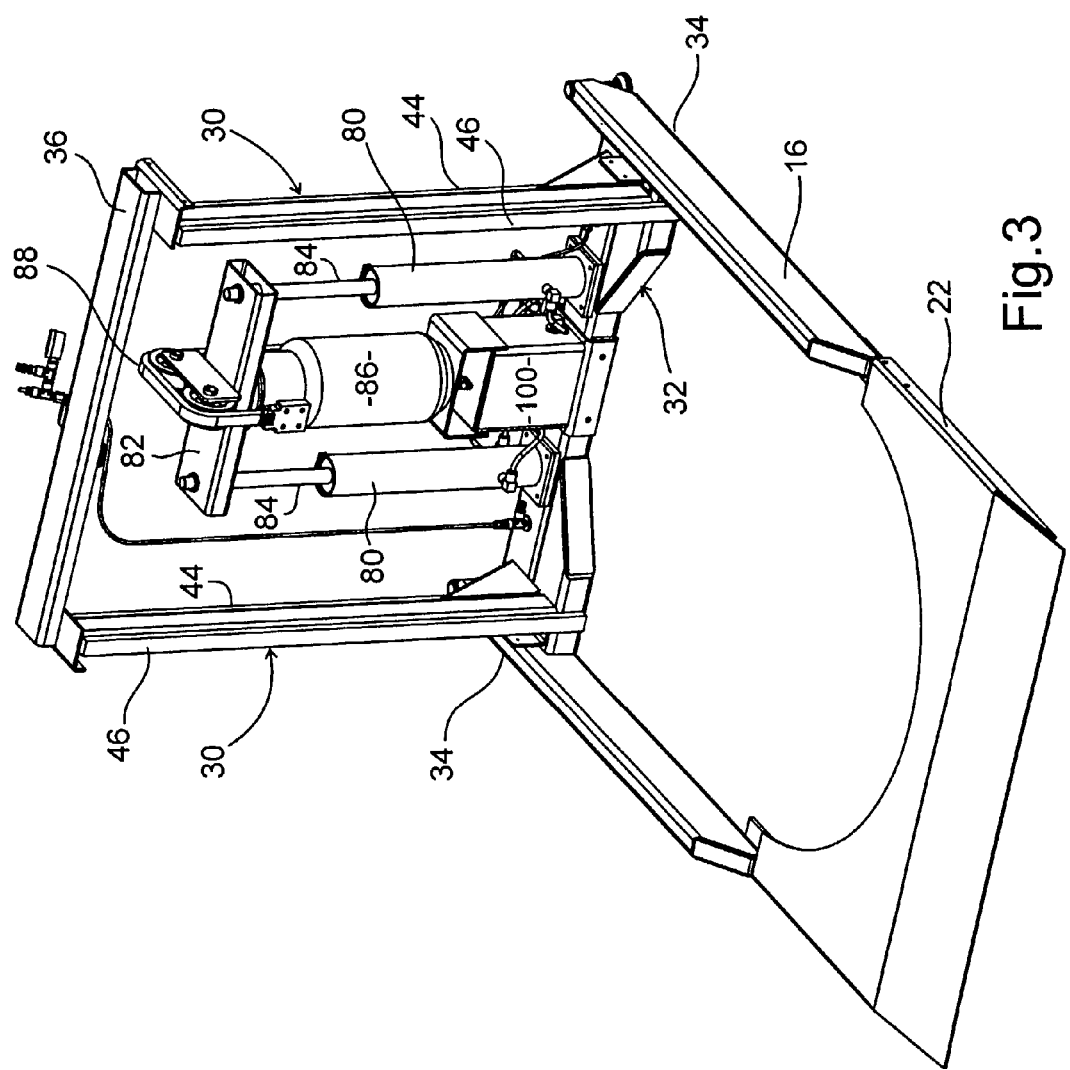
FIG. 3 is a front perspective view of the functional components constituting the stationary structural elements of the pallet positioner of FIG. 1.
Figure 4:
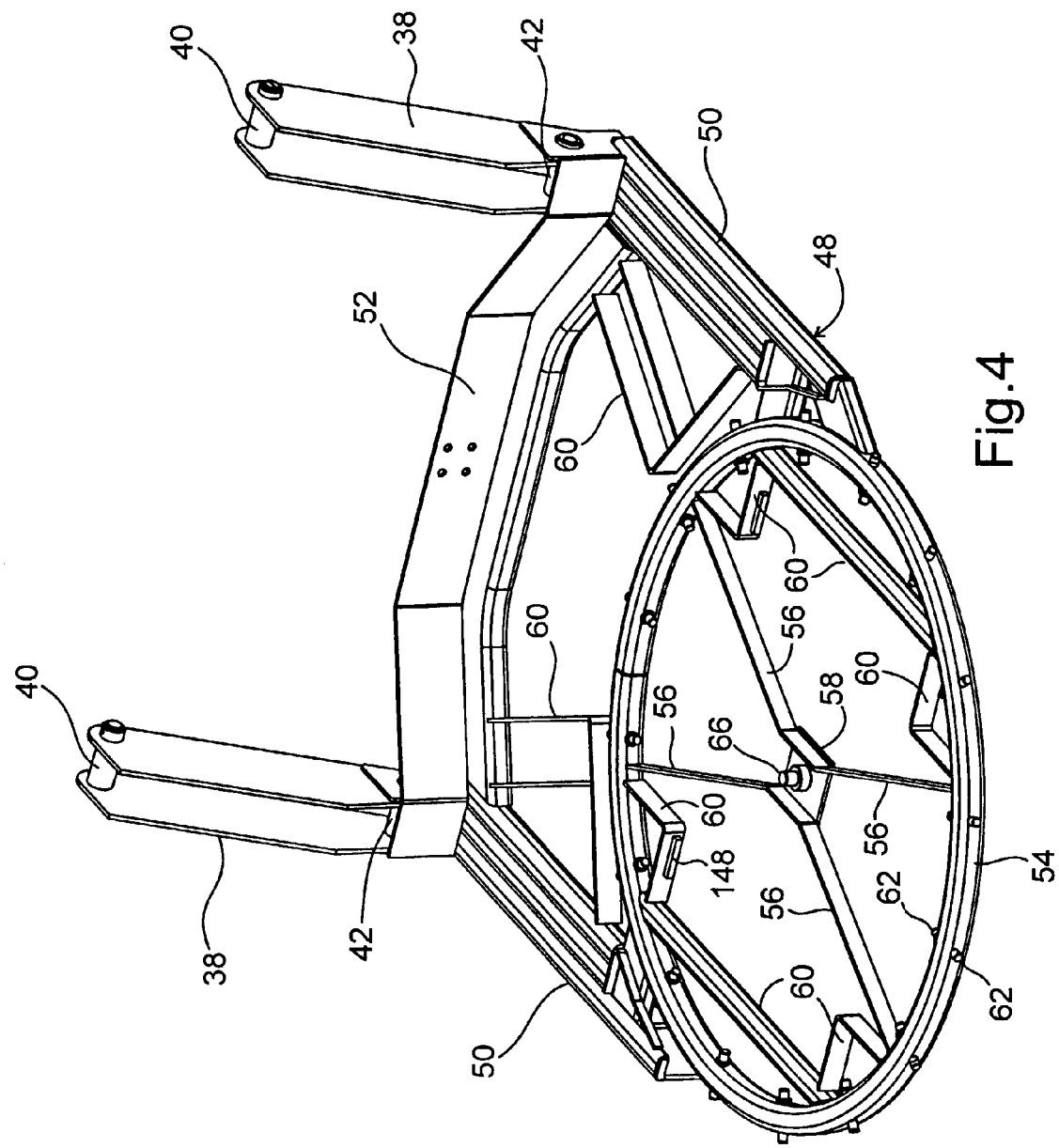
FIG. 4 is a front perspective view of the platform assembly of the pallet positioner of FIG. 1 seen in isolation.
Figure 5:
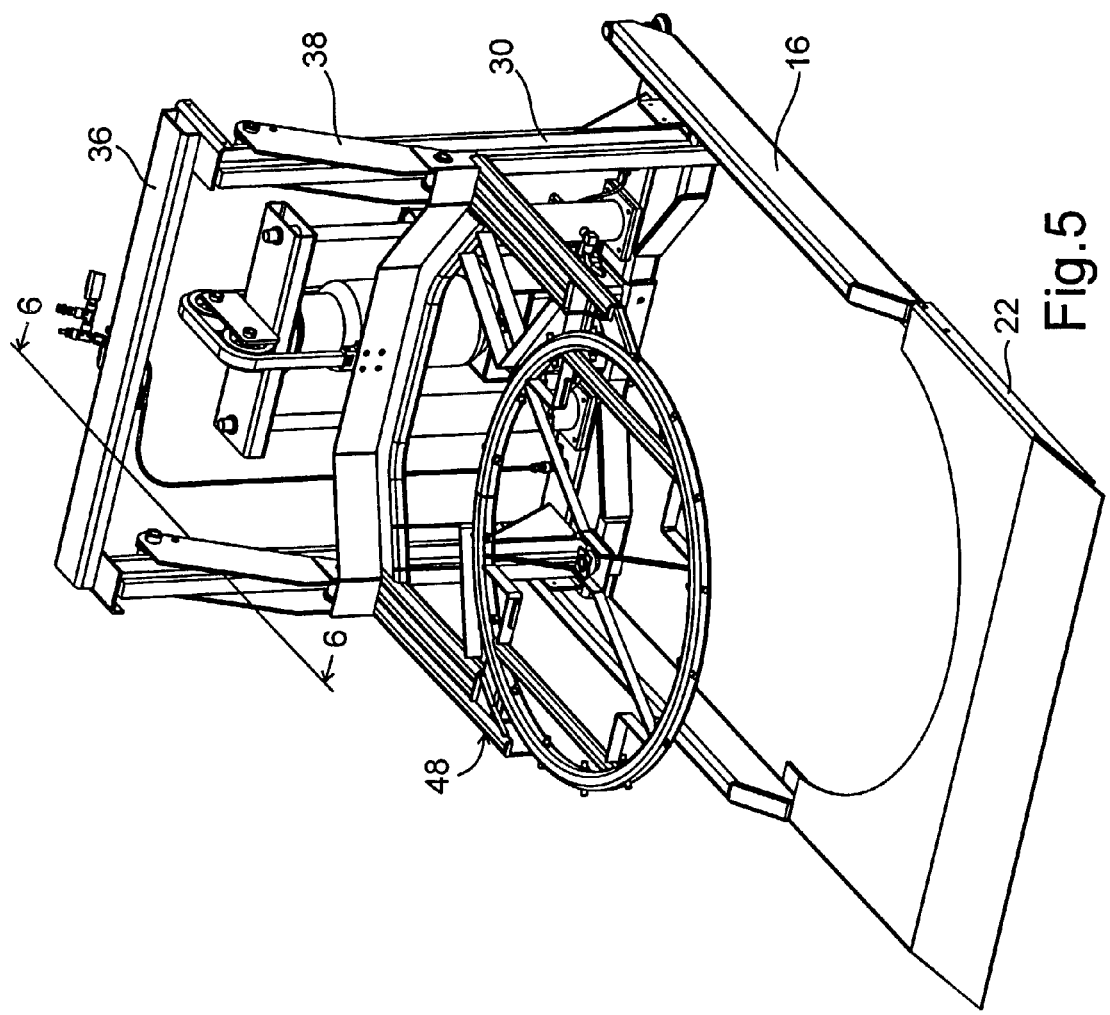
FIG. 5 shows the platform assembly of FIG. 4 installed in the pallet positioner of FIG. 1.
Figure 6:
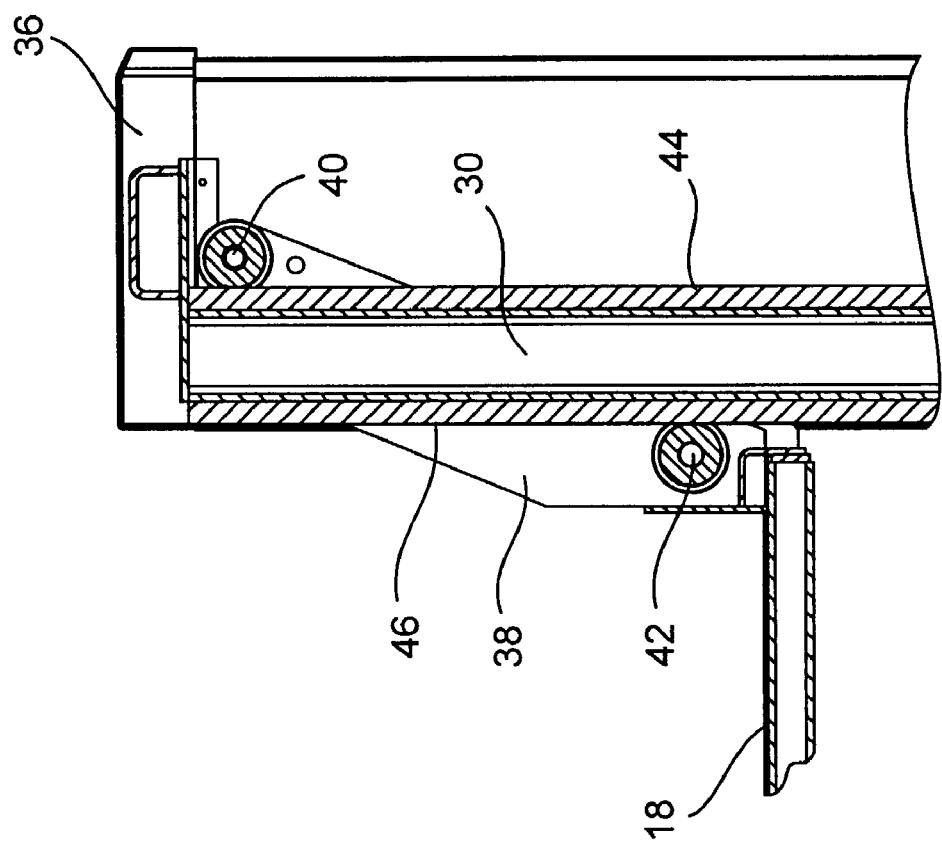
FIG. 6 is a side elevational view of a section of the pallet positioner of FIG. 1 taken from line 6-6 in FIG. 5 and showing front and rear rollers supporting the platform assembly in horizontal position in rolling engagement with a vertical mast.

FIGS. 3-5 show the structural elements of each functional component of the pallet positioner 10. As seen particularly in FIG. 3, the vertical structure 14 includes two rigid, vertical guide masts or columns 30 attached to a horizontal base 32 that braces the proximal ends 34 of the outriggers 16 and provides a support structure for the self-leveling mechanism of the invention. A top strut 36 is used to rigidly connect the top ends of the masts 30 and further strengthen the structure 14. FIG. 4 shows the platform assembly 12 without the plate covering the carrier 18 and without the rotating platform 20. The carrier 18 is supported by two inclined trusses 38 with free-wheeling upper rollers 40 and lower rollers 42 adapted to roll on the flat rear and front sides 44 and 46, respectively, of the vertical masts 30 (see also FIGS. 3 and 6). The angle of the trusses 38 is selected to keep the platform 20 in substantially horizontal position at all elevations, as illustrated in FIG. 5, where the skeleton 48 of the platform assembly 12 is shown installed on the guide masts 30. To facilitate fine adjustments, the ends of the pins supporting one or both sets of upper and lower rollers 40,42 may be slightly eccentric with respect to the rollers' axes of rotation. FIG. 6 is a cross section taken along line 6-6 in FIG. 5 to illustrate the support and vertical-rolling functions of the trusses 38 and rollers 42,44 in combination with the guide masts 30.

Referring back to FIG. 4, the skeleton 48 of the platform assembly 12 includes a plurality of thin horizontal beams 50 that project forward from a bracket 52 attached to the trusses 38 to provide a support for the platform 20 of the invention. A circular frame 54 for the platform 20 is attached to the structure formed by the beams 50 and includes cross-beams 56 that converge to a support plate 58 at the center of the circular frame 54. The beams 50 and the frame 54 are preferably constructed with thin square tubing (such as about 1.5×1.5 inches on the sides and 3/16 inch thick), and the cross-beams 56 of thin flat bars, to improve strength and minimize the weight of the platform assembly 12. Reinforcing braces 60 are also preferably used to further strengthen the structure.

Figure 7:
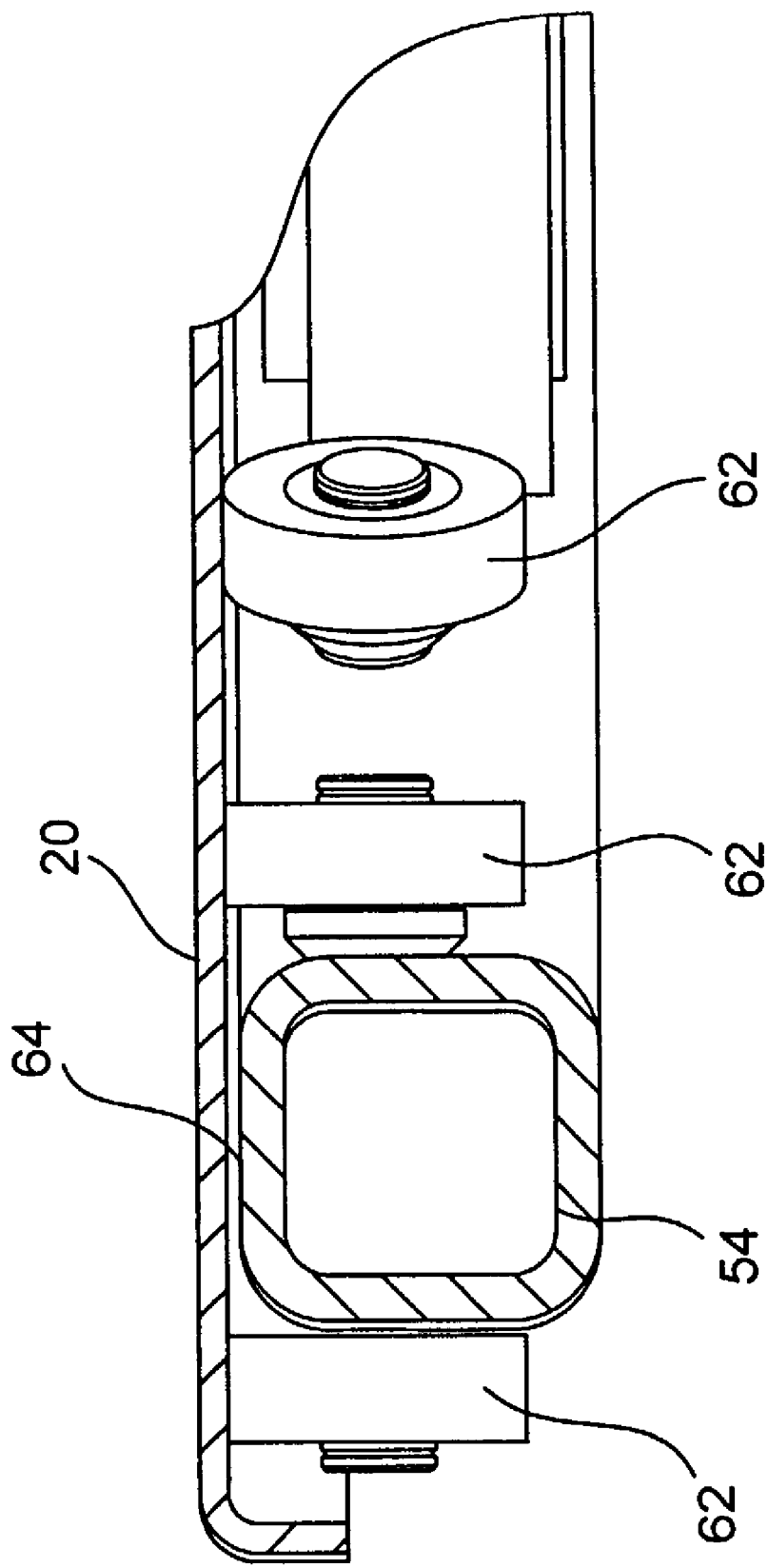
FIG. 7 is a side elevational view of another section of the pallet positioner of FIG. 1 taken from line 7-7 in FIG. 1 and showing vertical rollers supporting the periphery of the platform in rotational rolling engagement with a circular frame of the platform assembly.
Figure 8:
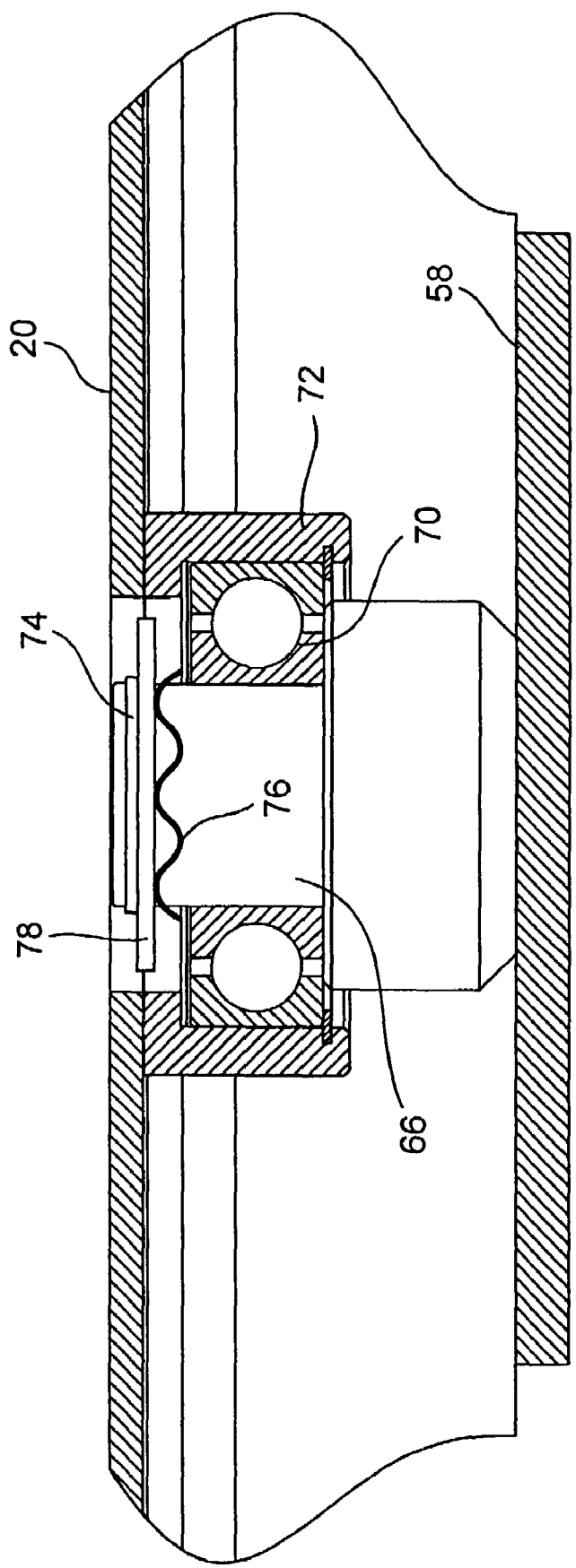
FIG. 8 is a side elevational view of yet another section of the pallet positioner of FIG. 1 taken from line 8-8 in FIG. 1 and showing a bearing/pivot arrangement supporting the center of the platform in rotational engagement with the circular frame of the platform assembly.

As also seen more clearly in the enlarged partial view of FIG. 7, the circular frame 54 includes multiple pairs of vertical rollers 62 mounted at regular intervals inside and outside the length of the frame 54. The rollers 62 provide support for the platform 20 and must, therefore, be installed with sufficient clearance 64 to allow the rotation of the platform 20 over the frame 54. A center pivot 66 in the plate 58 is journaled in a bearing 70 (FIG. 8) at the center of the platform 20 to maintain it in a centered position and avoid contact between the rollers 62 and the peripheral lip of the platform 20. FIG. 8 shows in detail the larger, bottom portion of the pivot 66 welded to the plate 58 at the center of the circular frame 54. The smaller, top portion of the pivot 66 is coupled with the bearing 70, and the bearing 70 is nested in a housing 72 that is welded to the circular platform 20 for rotation around the axis of the pivot 66. The pivot 66 retains the bearing 70 (and correspondingly the platform 20) in place by means of a snap ring 74 installed in the top portion of the pivot 66. An annular spring 76 acts downward on the bearing 70 and upward against a conventional washer 78 held in place by the snap ring 74. Thus, in order to lift the platform 20 off the carrier 18, the snap ring 74 is removed to release the pivot 66 from the bearing 70, thereby allowing separation of the pivot 66 and the bearing 70.

The self-leveling mechanism of the invention is illustrated in the frontal view of FIG. 3. Two double-acting hydraulic cylinders 80 are installed vertically between the masts 30 on the horizontal base 32, and a pulley block 82 is rigidly attached to the piston rods 84 extending upward from the cylinder barrels. Accordingly, a substantially rigid, extendable frame is provided within the vertical structure 14. A pneumatic bellows 86 is installed vertically between the horizontal base 32 and the pulley block 82, such that the bellows' extension or contraction causes a corresponding raising or lowering of the pulley block 82 along a vertical plane substantially parallel to the guide masts 30. As also seen in the partially unshrouded, rear perspective view of FIG. 9 and in the simplified side view of FIG. 10, a chain 88 is attached at one end to a block 90 in the carrier bracket 52 and at the other end to a fixed bracket 92. Two pulleys 94 span the chain 88 along the front and rear sides of the bellows 86, thereby providing a two-to-one ratio between the vertical motion of the carrier 18 and that of the pulley block 82. Thus, for every inch of expansion or contraction of the bellows 86, the platform 20 is raised or lowered two inches. The length of the chain 88 is selected such that the platform assembly 12 is at its lowest position at ground level when the bellows 86 is contracted and preferably at its highest position along the guide masts 30 when the bellows 86 is extended. Obviously, a belt, cord, strap or similar item could be used in equivalent fashion instead of the chain 88.

Figure 9:
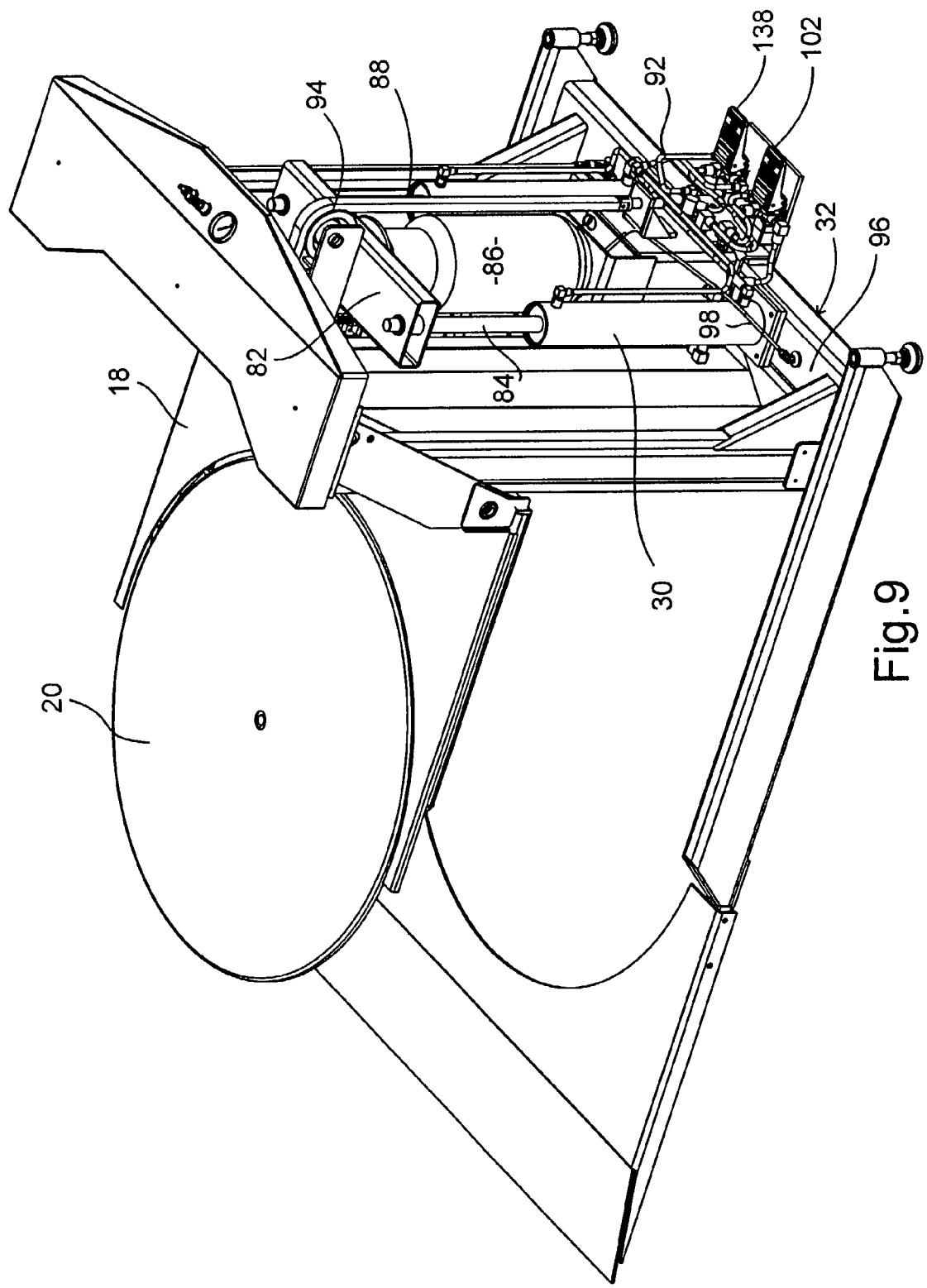
FIG. 9 is a rear perspective view of the pallet positioner of FIG. 1 without a rear cover that shrouds the hydraulic and pneumatic components.
Figure 10:
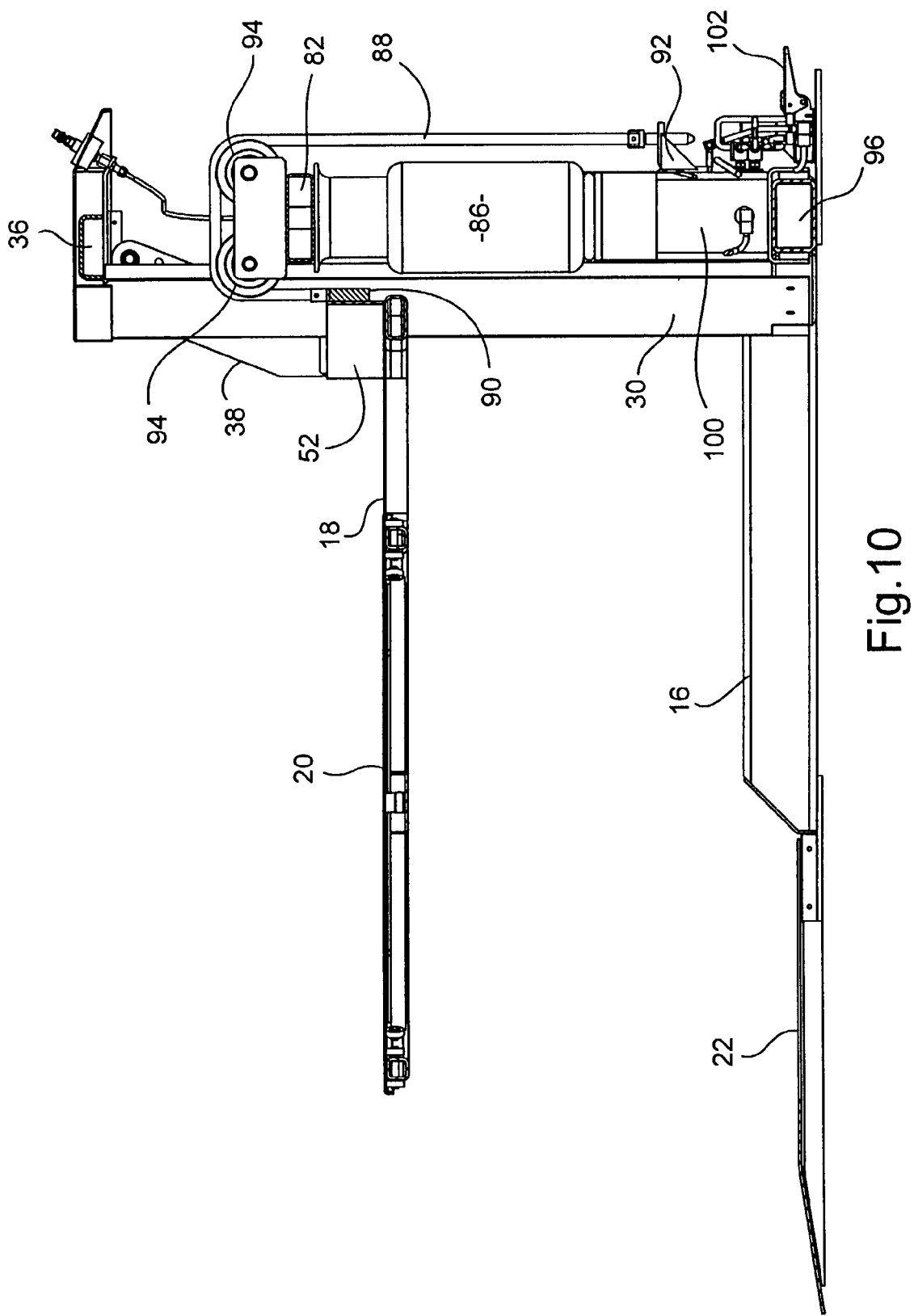
FIG. 10 is a simplified side elevational view of a section of the pallet positioner of FIG. 1 taken from a line passing between the nearer of two hydraulic cylinders and a bellows of the pallet positioner.

The pneumatic system that provides a self-leveling function to the pallet positioner 10 includes a fixed-volume reservoir 96 that is preferably incorporated into the horizontal base 32 and is connected to the bellows 86 via a line 98 seen in FIG. 9. The self-leveling function of bellows pneumatic systems is well understood in the art. Therefore, it is not detailed here. The hydraulic system coupled to the pneumatic bellows 86 according to the invention includes a hydraulic-fluid reservoir 100 connected to both cylinders 80 through a piping circuit illustrated alternatively in the schematic diagrams of FIGS. 11 and 12.

Figure 11:
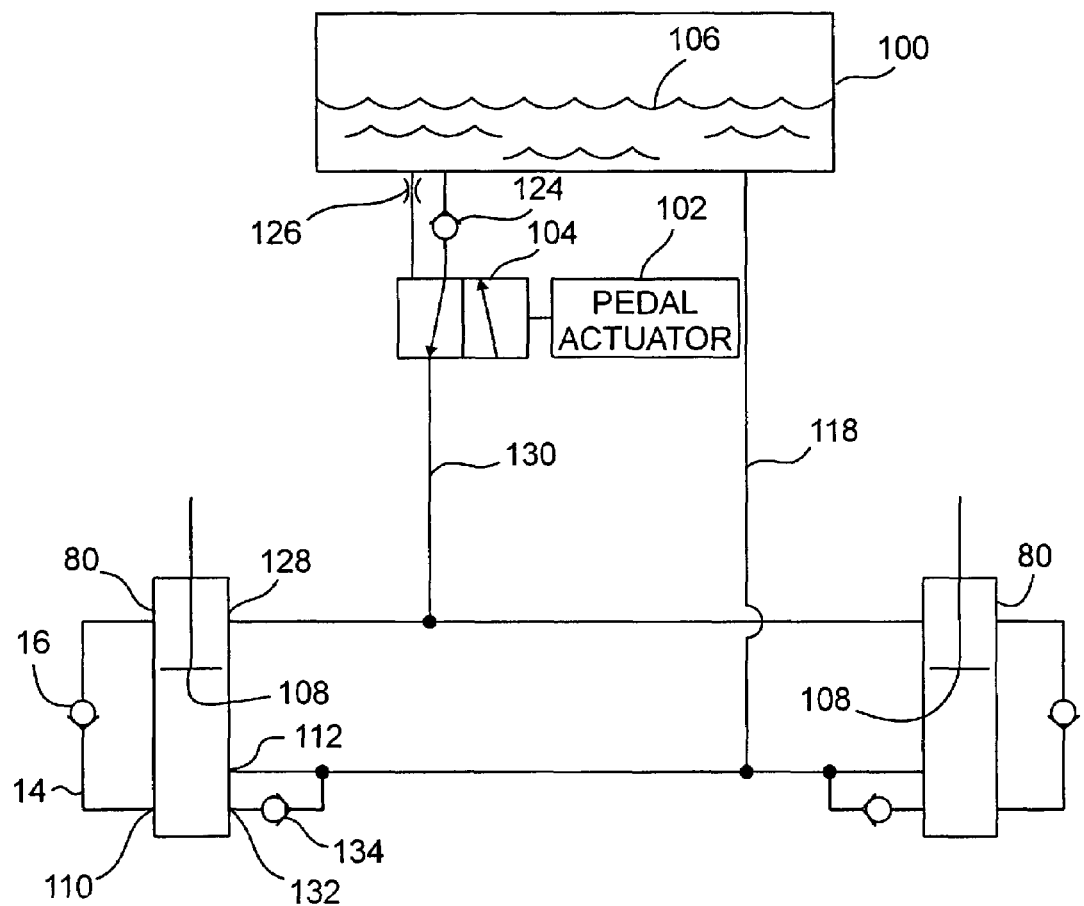
FIG. 11 is a diagram of a single-pedal embodiment of a hydraulic system for use in the pallet positioner of FIG. 1.

In a single-pedal implementation, illustrated in FIG. 11, the hydraulic system is controlled by a pedal 102 that actuates a normally-open control valve 104 through which hydraulic fluid 106 is withdrawn from the reservoir 100 and flows into the upper side of each cylinder 80 as the pistons 108 are lowered under the weight of increasing loads placed on the platform 20 of the pallet positioner 10 against the upward force exerted by the bellows 86. During the descent of the pistons 108, the fluid present in the lower side of the cylinders (due to their double-acting nature) is forced out through multiple lower ports 110 and 112. Port 110 feeds a bypass line 114 to the upper side of the cylinder 80 through a check valve 116. Port 112, on the other hand, feeds an open return line 118 to the reservoir 100.

Figure 13:
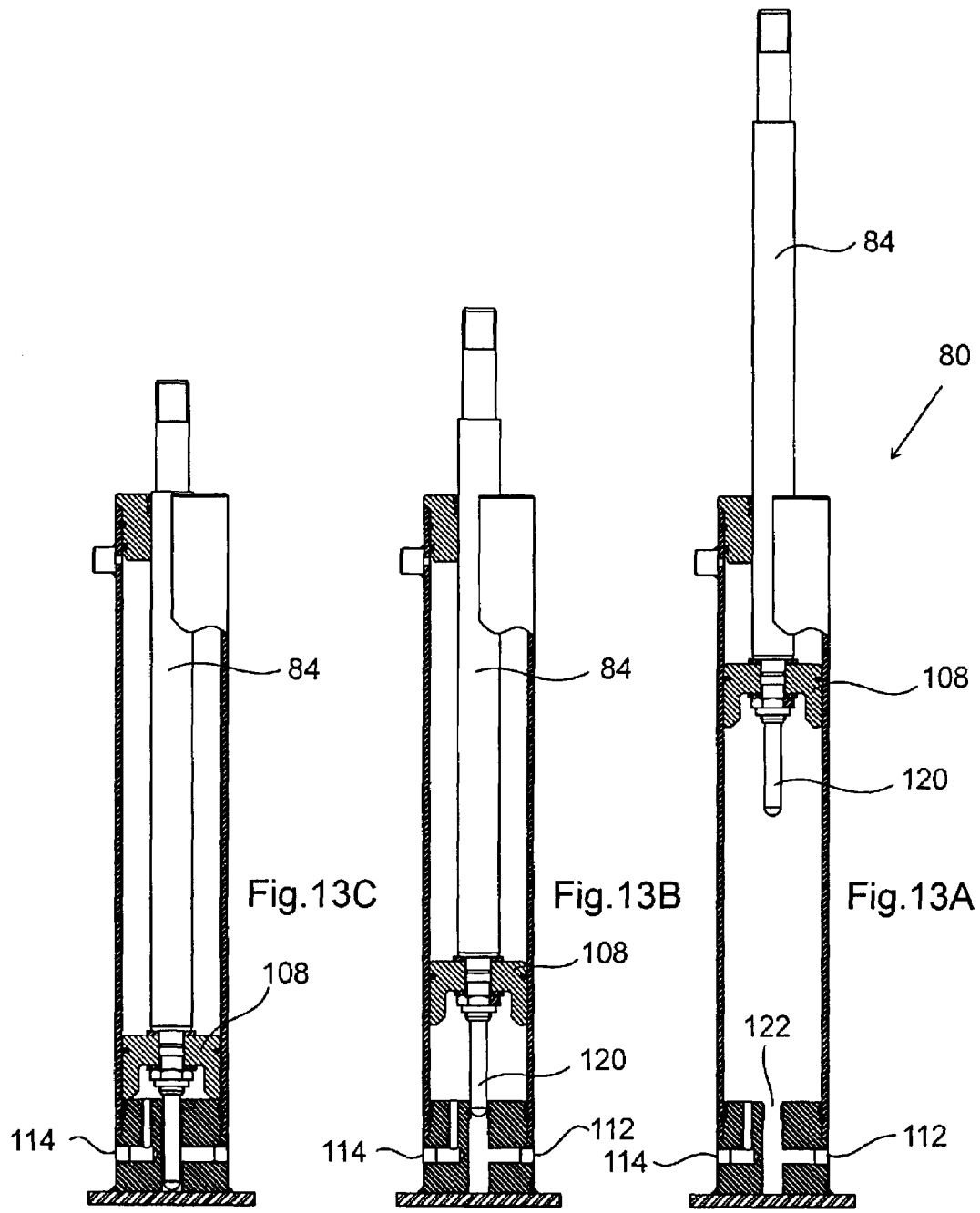
FIGS. 13A-13C illustrate internal details of hydraulic cylinders for use in the pallet positioner of FIG. 1.

FIGS. 13A-13C illustrate the internal details of each cylinder 80. The lower side of the piston 108 is fitted with a plunger rod or projection 120 adapted to penetrate and block fluid flow through a conforming bore or flow passage 122 connected to port 112. Thus, when the plunger rod 120 is introduced into the bore 122 as the piston 108 approaches the bottom of its travel, the descent of the piston 108 is stopped because the fluid can no longer exit through port 112. Because a check valve 124 prevents the return of fluid through the control valve 104, and because a larger volume of fluid is contained in the lower than in the upper side of the cylinder 80 (due to volume occupied in the upper side by the rod 84), the fluid also cannot pass through port 110, which locks the piston at the height where the plunger rod 120 first engages the bore 122, as illustrated in FIG. 13B.

This cylinder configuration affords an economical means for advantageously implementing a safety feature that prevents entanglement of an operator's feet between a misaligned pallet and the outriggers 16 as the carrier 18 approaches ground level. To that end, the bore 122 is designed to first engage the plunger rod 120 when the carrier 18 and the platform 20 are sufficiently high to clear the outriggers 16. This stop at an intermediate position between the uppermost and lowermost positions of the carrier 18 and the platform 20 also forces the operator to check the alignment of the pallet with the outriggers 16 before the platform 20 is lowered all the way. This last step requires intervention by an operator who, by stepping on the pedal 102, can switch the control valve 104 to the exhaust port 126, thereby allowing the release of fluid from the lower side of the cylinder 80 into the reservoir 100 through the bypass line 114, the upper side of the cylinder 80, the upper port 128, and the feed line 130. This action allows the piston 108 to reach bottom, as illustrated in FIG. 13C, and causes the platform 20 to reach ground level.

When the pedal 102 is released, the platform 20 will remain at ground level even after the load is removed from the pallet positioner 10 because the check valve 124 prevents exhausting any fluid from the upper side of the cylinder 80. Thus, the cylinders 80 remain locked in place and the carrier 18 is safely kept at ground level even against the upward pressure exerted by the bellows 86. In order to raise the carrier 18 to its upper position to load a new pallet, the pedal 102 is again actuated to switch the position of the control valve 104 to its exhaust port 126. Now the hydraulic fluid is able to flow back to the reservoir 100 from the upper side of the cylinder 80, while the space correspondingly created in the lower side is filled from the reservoir 100 through the lower port 112. An additional lower port 132 (not shown in FIGS. 13A-C), connected to line 118 through a check valve 134, is provided to supply the lower side of the cylinder 80 prior to the disengagement of the plunger rod 120 from the bore 122.

Figure 12:
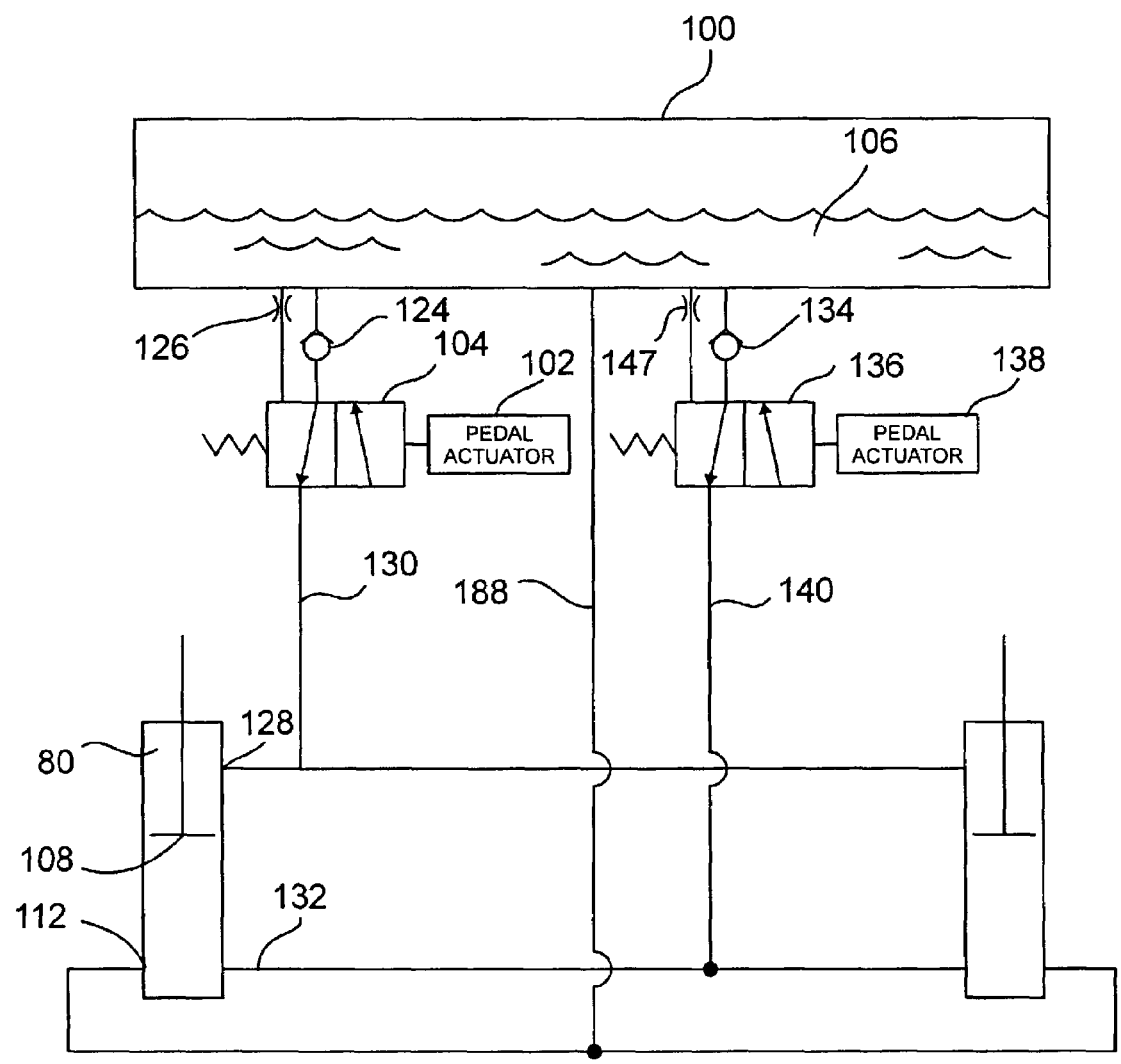
FIG. 12 is a diagram of a double-pedal embodiment of a hydraulic system for use in the pallet positioner of FIG. 1.

FIG. 12 is a schematic diagram of a double-pedal implementation of an hydraulic system for use in the pallet positioner 10. Rather than utilizing a bypass line 114 to exhaust the lower side of the cylinder 80 through the control valve 104 during the last portion of the piston's descent (i.e., after the plunger rod 120 blocks the bore 122), an additional control valve 136 activated by a second pedal 138 is utilized. The new valve 136 is normally open and controls the flow through an additional line 140 which is connected to the lower port 132 and incorporates the check valve 134 of each cylinder 80. Thus, the final travel segment of the piston 108 toward ground level is activated by pressing the pedal 138, which enables the release of fluid from the lower side of the cylinder 80 through its exhaust port 132.

The reservoir 100 is connected with the ports 112 of the two cylinders 80 by an open return line 188. An additional exhaust port 147 is provided for the additional control valve 136.

In all other respects, the embodiment of FIG. 12 functions the same way as that described for FIG. 11.

Figure 14:
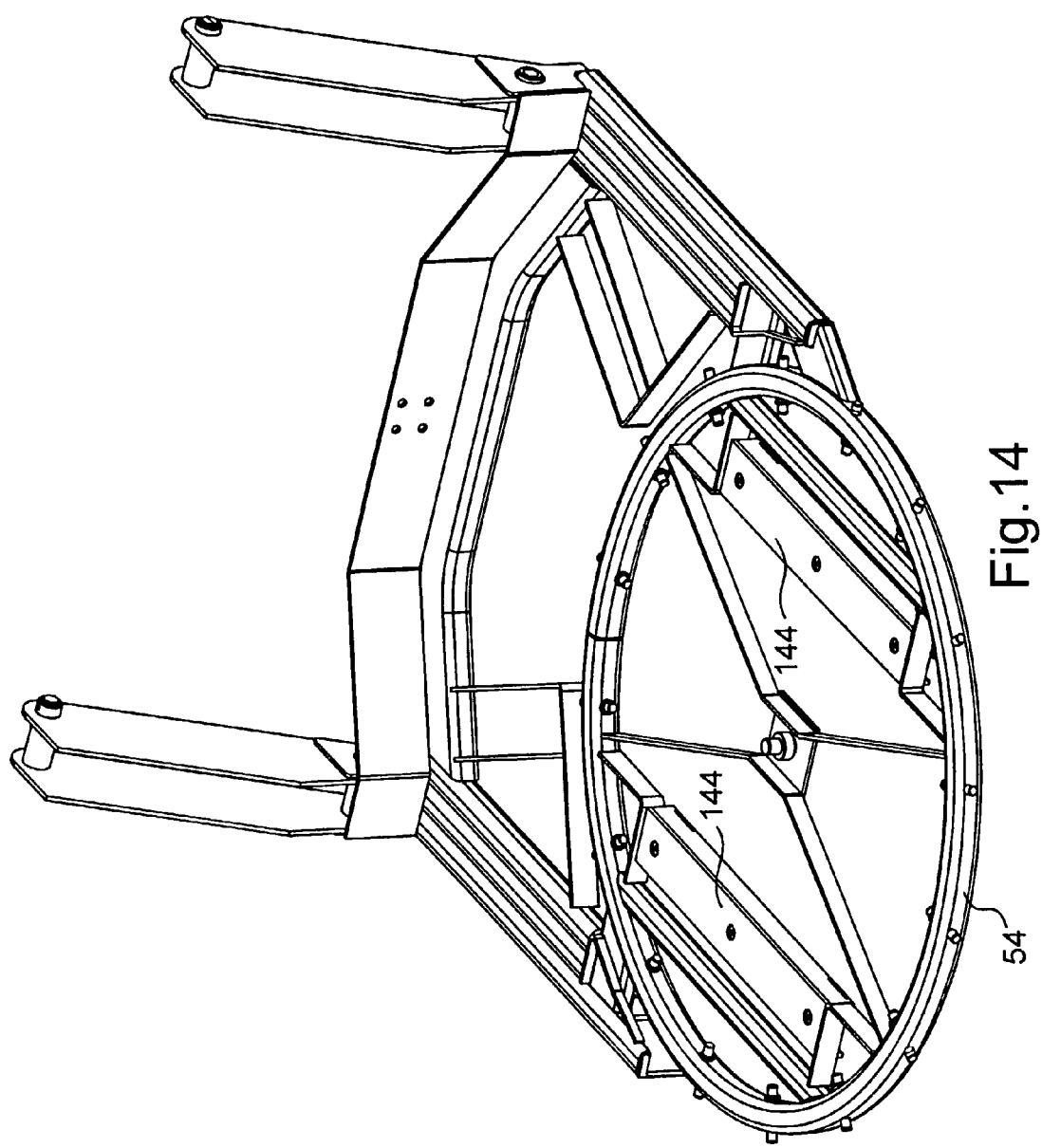
FIG. 14 is a front perspective view of a platform assembly similar to that of FIG. 4 but including two brake mechanisms which are located within the circular frame that supports the platform and operate to prevent rotation of the platform.

According to another aspect of the invention, a brake mechanism 144 is used to automatically prevent rotation of the platform 20 as it approaches ground level. As illustrated in FIG. 14, the brake mechanism 144 is installed, preferably in pairs, under the platform 20 within the circular frame 54 of the platform assembly 12. FIGS. 15A-15C illustrate the operation of the brake mechanism 144, which comprises an upside-down channel structure 146 (shown in sectioned view) slidably anchored to two horizontal bars 148 protruding from the reinforcing braces 60 in the circular frame 54 (see also FIG. 4). Thus, by virtue of the channel geometry of the structure 146, the brake mechanism 144 is able to slide vertically with respect to the bars 148 and the circular frame 54. The bottom portion of the structure 146 includes two downward-facing thimble-like cups 150 attached to the structure 146 through corresponding bottom plates 152. Each cup 150 houses a flat-wire compression spring or biasing element 154 anchored to the top plate 156 of the structure 146. The bottom of each cup 150 constitutes an abutment for the respective spring 154, and the springs 154 are adapted to urge the cups 150 downward to positions in which the bottoms of the cups 150 are located below the platform assembly 12. A rubberized brake layer or friction element 158 held in place by screws 160 covers the top plate 156 of the brake mechanism 144, and the cups 150 are movable relative to the platform assembly 12 and the brake layer 158.

As seen in FIG. 15A, when the carrier 18 of the pallet positioner 10 is off the ground G, the top brake layer 158 of the brake mechanism 144 is separated from the platform 20 by a gap 162, such that the platform 20 is free to rotate unencumbered by the brake mechanism 144. When the bottoms of the cups 150 touch the ground, as illustrated in FIG. 15B, they are lifted upward and compress the springs 154 to also urge the channel structure 146 toward the bottom surface of the platform 20. When sufficient displacement has been achieved, such as when the carrier 18 rests on the ground G, the brake layer 158 is frictionally engaged to the platform 20 to prevent its rotation, as seen in FIG. 15C. Obviously, as the carrier 18 and the platform 20 are raised during the next cycle of operation, the cups 150 drop down and release the brake mechanism 144. The brake layers 158 can be considered retaining members for preventing rotation of the platform 20.

Figure 16A:
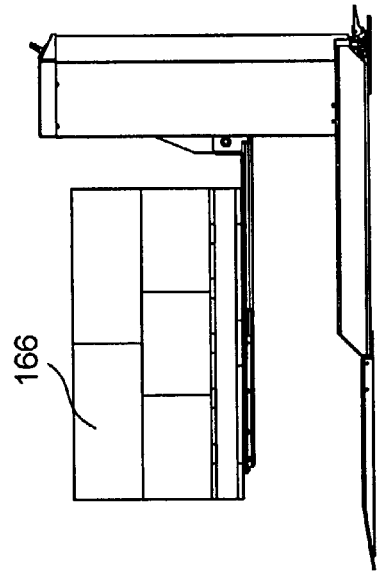
FIGS. 16A-16D illustrate a typical cycle of operation of the pallet positioner of FIG. 1.
Figure 16B:
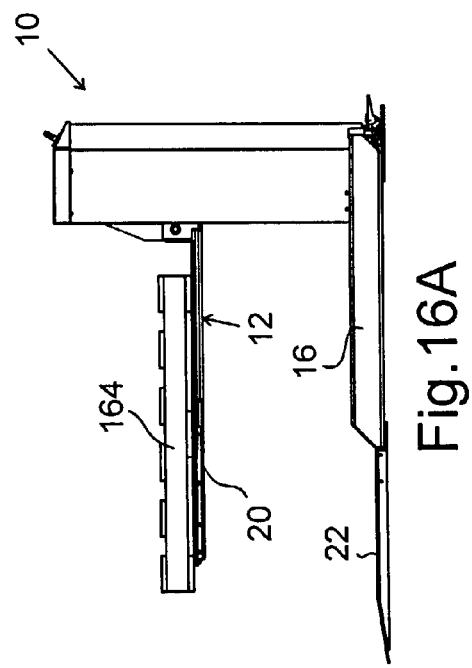
Figure 16C:
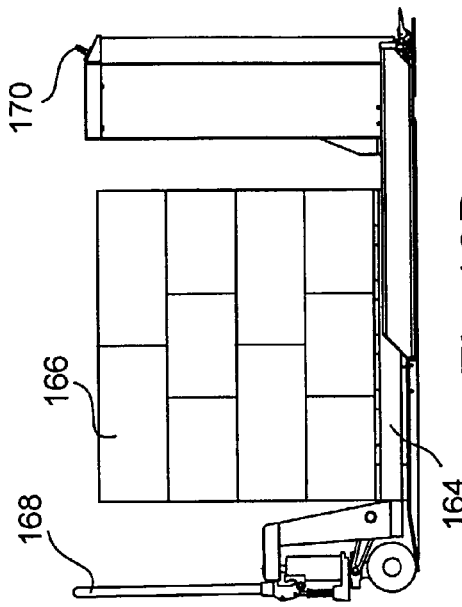
Figure 16D:
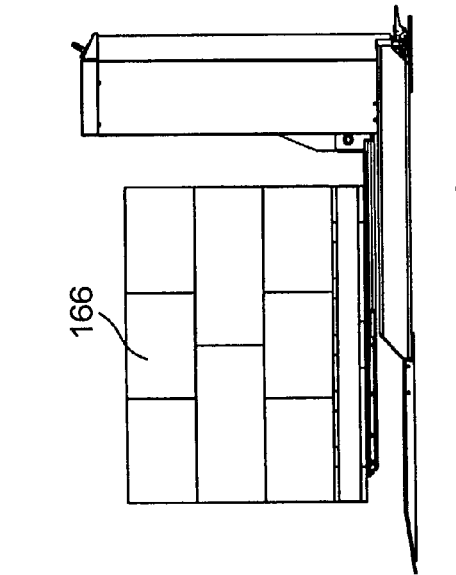

FIGS. 16A-16D illustrate four stages of the typical cycle of operation of the pallet positioner 10 of the invention. FIG. 16A shows the positioner 10 with the platform assembly 12 raised to its maximum height to begin loading. A pallet 164 is placed on the rotating platform 20 either at ground level or in its raised position. As boxes 166 are stacked on the platform 20, the height of the platform assembly 12 is automatically lowered against the pressure of the pneumatic bellows 86 to maintain a comfortable loading height, as shown in FIG. 16B. During this time, the orientation of the pallet 164 can be changed at will as needed by rotating the platform 20. When the platform assembly 12 reaches the minimum elevation for clearance of the outriggers (that is, when the plunger rods 120 in the cylinders 80 begin to penetrate the bores 122), the descent is automatically interrupted for a safe operation. This stage is illustrated in FIG. 16C. Finally, when the pedal 102 (or pedal 138, in the two-pedal embodiment) is depressed, the platform assembly 12 is allowed to reach the ground under the weight of the load. A pallet truck 168 can then be placed within the bottom runners of the pallet 164 to remove the pallet 164 and its load of boxes 166 from the pallet positioner 10 of the invention. Thereafter, the cycle is restarted by again depressing pedal 102, as explained above.

It is noted that the pressure of the air (or other gas that may be utilized) in the pneumatic system of the invention is selected to provide the desired self-leveling action, which is a function of the density of the material loaded on the pallet 164. Accordingly, an external normally-closed inlet valve 170 is provided to appropriately pressurize the system.

Turning to FIGS. 17-24, the same numerals as in FIGS. 1-16, plus 200, have been used to identify similar elements. Since the correspondence between similar elements of FIGS. 1-16 and FIGS. 17-24 will be evident from the numbering, it is not necessary to specifically mention all numerals of FIGS. 17-24 in the following description.

Referring to FIGS. 17 and 18, the ramp 222 of the pallet positioner 210 does not bridge the outriggers 216 unlike the ramp 22 of the pallet positioner 10 which extends from one of the outriggers 16 to the other. The ramp 222 has oppositely directed lateral faces 372, and a mounting structure 374 is rigidly connected to each of the lateral faces 372. Each of the mounting structures 374 includes a series of strips 376 which stand on edge and cooperate with the respective lateral face 372 to define a polygonal frame. The strips 376 of each frame are braced by a horizontal plate 378 located at the respective lateral face 372 and a horizontal plate 380 located on the side of the frame opposite the lateral face 372.

A horizontal plate 382 projects from the distal end 226 of each outrigger 216 in a direction away from the base 232, and the horizontal plates 382 are fast with the respective outriggers 216. Each of the horizontal plates 382 is provided with an opening for securing the corresponding outrigger 216 to a foundation. A strip 384 standing on edge is mounted on each of the horizontal plates 382.

One of the strips 376 of each mounting structure 374 is generally parallel to the lateral faces 372 of the ramp 222, and each of these strips 376 has an extension 386 which overlaps a respective strip 384. Each extension 386 is pivotally connected to the adjoining strip 384 near the distal end 226 of the respective outrigger 216 thereby enabling the ramp 222 and the mounting structures 374 to be pivoted upward from the operative position shown in FIGS. 17 and 18. Each extension 386 is provided with an opening which registers with an opening in the adjoining strip 384 when the ramp 222 and the mounting structures 374 are in their operative position. A pin 387 is receivable in each pair of registering openings to releasably lock the ramp 222 and the mounting structures 374 in the operative position.

Figure 19:
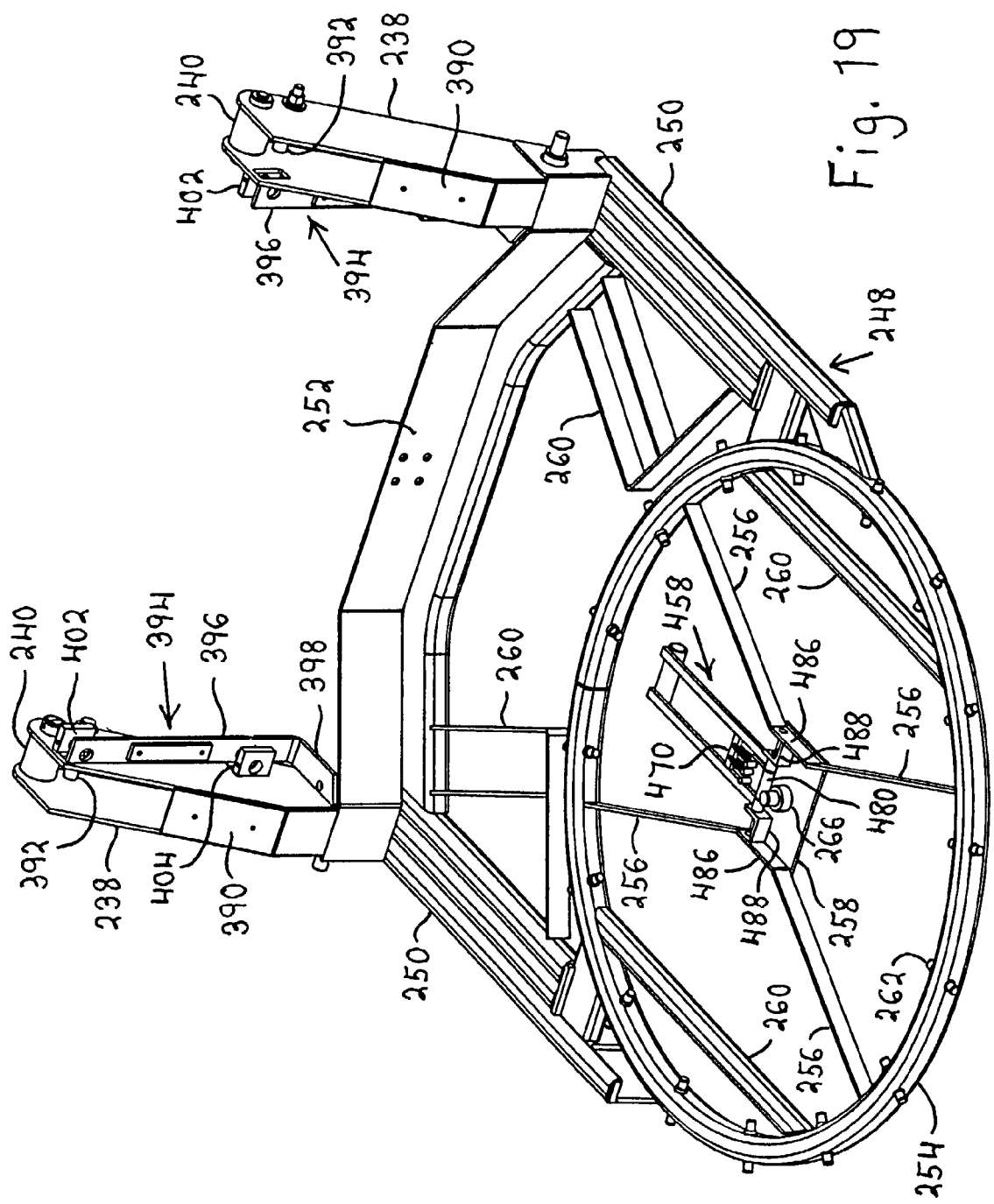
FIG. 19 is a view similar to FIG. 4 of the pallet positioner of FIG. 17.

FIG. 19 illustrates that the platform carrier 218 of the pallet positioner 210 differs in certain respects from the platform carrier 18 of the pallet positioner 10. Similarly to the trusses 38 of the pallet positioner 10, each of the trusses 238 of the pallet positioner 210 has an open side facing the circular frame 254 on which the rotatable platform 220 rests. However, in contrast to the trusses 38 of the pallet positioner 10, the lower half of each of these open sides of the trusses 238 is closed by a cover plate 390. Furthermore, unlike the platform carrier 18 of the pallet positioner 10, a spacer tube 392 is mounted on each truss 238 of the pallet positioner 210 below the respective upper roller 240. Each of the spacer tubes 392 is disposed adjacent to, and is parallel to, the neighboring upper roller 240.

Like the trusses 38 of the pallet positioner 10, each of the trusses 238 of the pallet positioner 210 has a lateral surface which faces the other truss 238. However, contrary to the pallet positioner 10, a bearing member 394 is fixed to the facing lateral surfaces of the trusses 238. Each of the bearing members 394 includes an L-shaped element having a generally vertical leg 396 and a generally horizontal leg 398. Each vertical leg 396 has a surface facing to the rear of the platform carrier 218. A block 402 is fixed parallel to the respective vertical leg 396. Each vertical leg 396 defines a gap with the corresponding block 402 designed to receive a non-illustrated ball bearing. An opening in each vertical leg 396 registers with an opening in the block 402 and each pair of registering openings receives a non-illustrated shaft for the respective ball bearing.

A block 404 is also provided affixed next to each vertical leg 396 near the lower end thereof. An opening in each vertical leg 396 registers with an opening in the block 404 and each pair of registering openings receives a non-illustrated shaft for the respective ball bearing.

The horizontal bars 148 and corresponding reinforcing braces 60 inside the circular frame 54 of the pallet positioner 10 are omitted in the pallet positioner 210.

The platform assembly 12 of the pallet positioner 10 is pneumatically and hydraulically operated and is self-leveling. On the other hand, the platform assembly 212 of the pallet positioner 210 is electrically and hydraulically operated and is not self-leveling.

Figure 20:
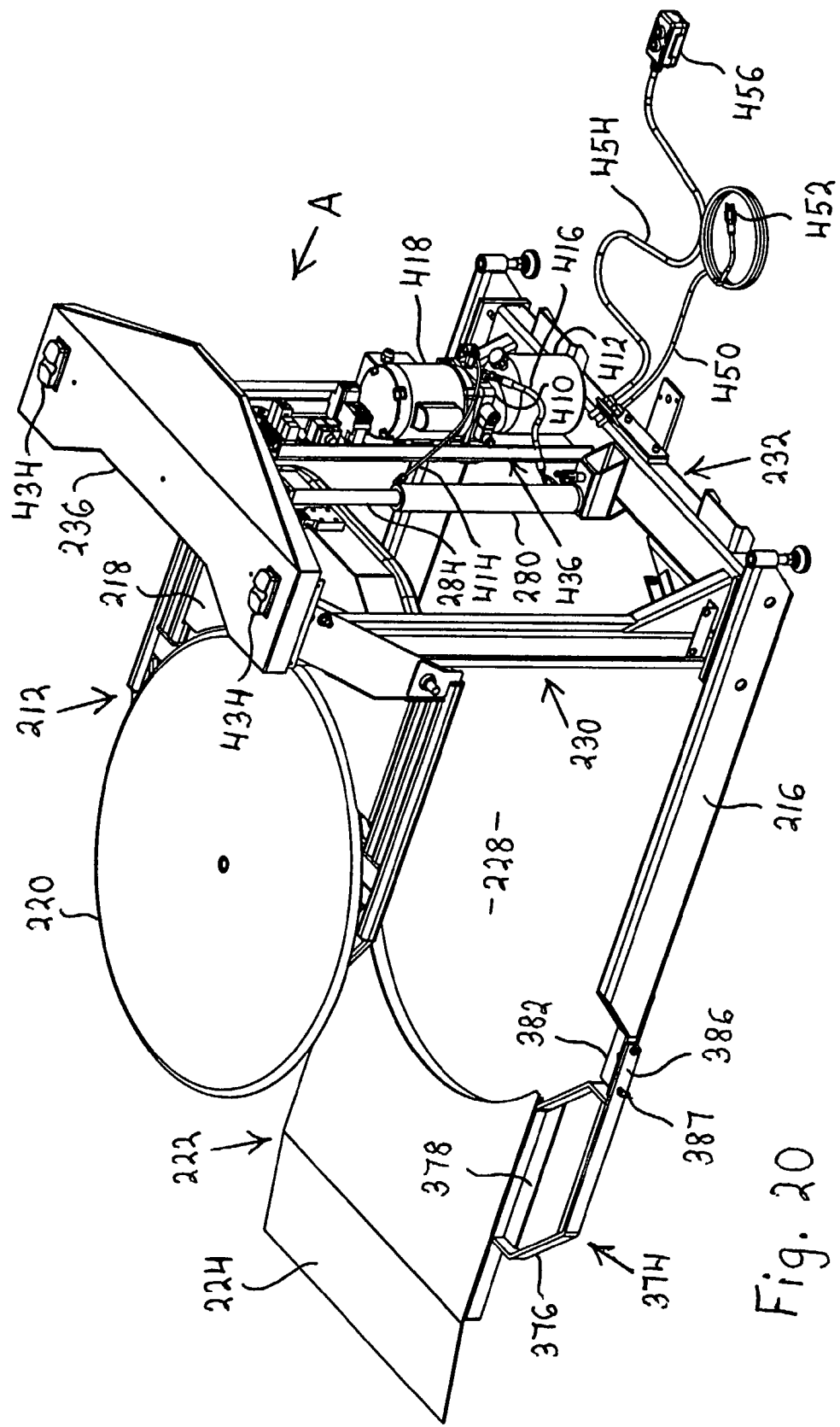
FIG. 20 is a view similar to FIG. 9 of the pallet positioner of FIG. 17.

Considering FIGS. 18 and 20, the dual hydraulic cylinders 80 of the pallet positioner 10 are replaced by a single hydraulic cylinder 280 in the pallet positioner 210. Since only one hydraulic cylinder 280 is employed in the pallet positioner 210, the pulley block 82 of the pallet positioner 10 may be eliminated. The hydraulic cylinder 280 is mounted on the base 232 of the pallet positioner 210 midway between the masts 230, and a single pulley not visible in the drawings is fixed to the upper end of the piston rod 284 which rides in the cylinder 280. The pulley is shielded by a cap or cover 408.

The piston rod 284 of the hydraulic cylinder 280 is driven by a pump 410 which sits on top of a reservoir 412 for hydraulic fluid. The reservoir 412 is mounted above the base 232 of the pallet positioner 210. The pump 410 is connected to the cylinder 280 by a tube 414 running to the upper end of the cylinder 280 and a hose 416 running to the lower end of the cylinder 280.

Figure 21:
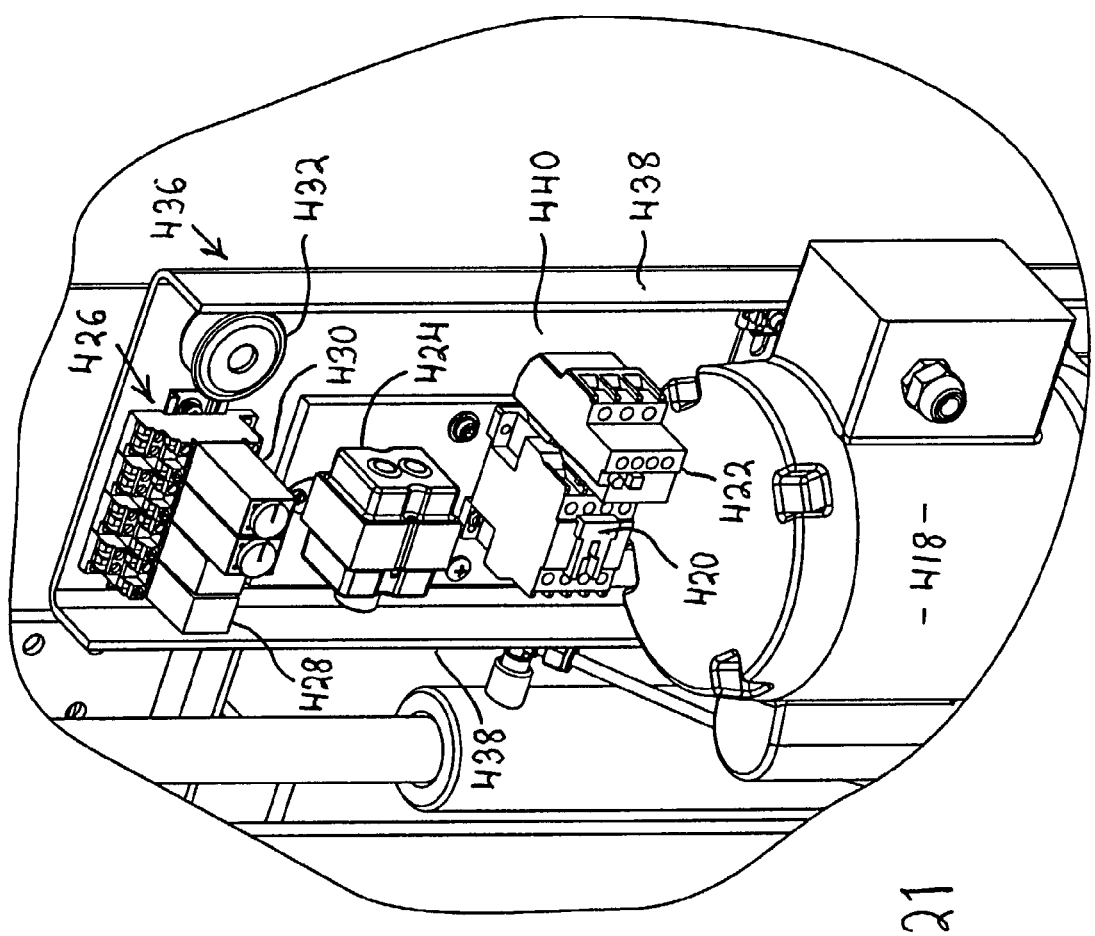
FIG. 21 is an enlarged fragmentary rear perspective view of the pallet positioner of FIG. 17, as seen in the direction of the arrow A of FIG. 20, showing certain electrical components of the pallet positioner.

The pump 410 is driven by an electric motor 418 disposed on top of the pump 410. As best seen in FIG. 21, an IEC contactor 420 and an overload relay 422 are located side-by-side above the motor 418. A transformer 424 is situated above the contactor 420 and the relay 422 while a relay block 426 is situated above the transformer 424. The relay block 426 includes a pair of relays 428 and a pair of timers 430. A horn or buzzer 432 constituting an audible warning device or alarm is located next to the relay block 426.

FIGS. 17, 18 and 20 illustrate that a light 434 is mounted at either end of the top strut 236 which connects the upper ends of the masts 230 to one another. The lights 434 constitute visual warning devices or alarms.

Considering FIGS. 18, 20 and 21, an elongated U-shaped member 436 is mounted in an upright position on the base 232 of the pallet positioner 210 to one side of the hydraulic cylinder 280. The U-shaped member 436 comprises a pair of spaced vertical legs 438 running longitudinally of the U-shaped member 436 and a crosspiece 440 joining the legs 438 to one another. The U-shaped member 436 is arranged with the legs 438 facing rearward of the pallet positioner 210. The motor 418, the contactor 420, the overload relay 422, the transformer 424, the relay block 426 and the horn or buzzer 432 are all fixed to the crosspiece 440 between the legs 438.

As best seen in FIG. 18, an elongated L-shaped member 442 is mounted in an upright position on the base 232 of the pallet positioner 210 adjacent to one of the masts 230. The L-shaped member 442 includes a leg 444 which is located in a plane parallel to the legs 438 of the U-shaped member 436. The L-shaped member 442 further includes a leg 446 which is perpendicular to the leg 444 and is situated between the latter and the neighboring mast 230. A limit switch 448 is mounted at the upper end of the leg 446 and is arranged to be tripped by the lower end of the vertical leg 396 which travels on the neighboring mast 230 when the leg 396 arrives at the switch 448 from above. Tripping of the limit switch 448 by the leg 396 causes the motor 418 to be shut off or deactivated.

The motor 418, the contactor 420, the overload relay 422, the transformer 424, the relay block 426, the horn or buzzer 432 and the lights 434 are provided with power by way of an electrical cord 450 equipped with a power plug 452. Another electrical cord 454 with a control element 456 allows an operator to regulate the motor 418 which, in turn, controls movement of the platform assembly 212. The control element 456 includes a depressible "raise" button and a depressible "lower" button for moving the platform assembly 212 up and down, respectively. The platform assembly 212 has an uppermost position and a lowermost position and stops automatically upon arriving at either of these positions. During downward movement from a location above the limit switch 448, the platform assembly 212 also stops automatically at an intermediate position between the uppermost and lowermost positions. This intermediate position is the position occupied by the platform assembly 212 when the leg 396 on the mast 230 adjacent to the limit switch 448 trips the latter. In the intermediate position, there is a clearance between the platform assembly 212 and the outriggers 216, and such clearance is sufficiently large to allow free movement of an operator's foot in the clearance. Stopping of the platform assembly 212 in the intermediate position warns an operator to keep his or her feet from underneath the platform assembly 212.

Figure 23:
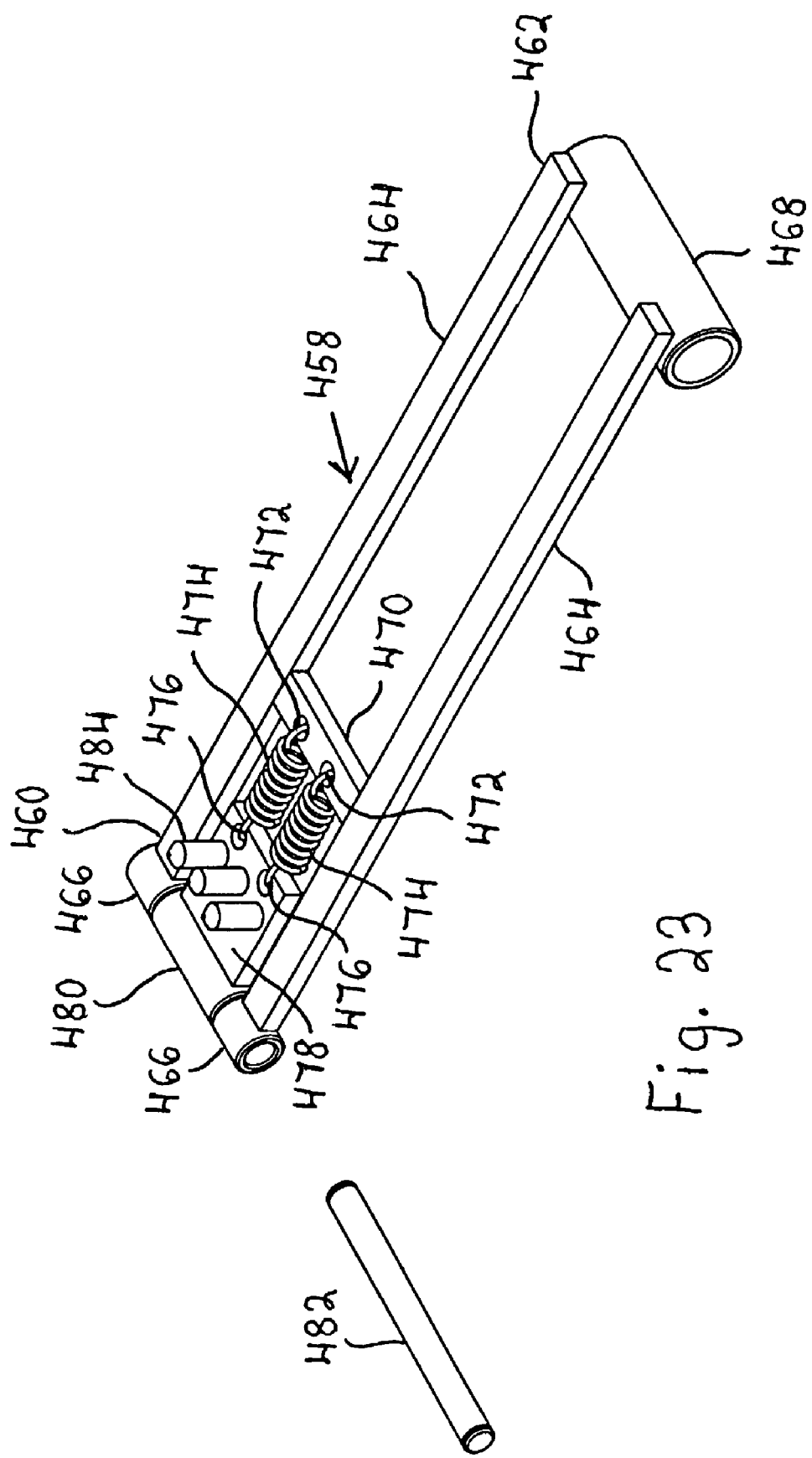
FIG. 23 is an enlarged top perspective view of a braking member for preventing rotation of the platform of FIG. 22.

In the pallet positioner 210, the brake mechanism 144 of the pallet positioner 10 is replaced by a different brake mechanism. Referring to FIGS. 19 and 23, the brake mechanism of the pallet positioner 210 comprises an arm or elongated member 458 having opposite longitudinal ends 460 and 462. The arm 458 includes two elongated strip-like elements 464 which are spaced transversely of the arm 458 and extend longitudinally of the latter in parallelism with one another. The strip-like elements 464 have the same length and one end of each strip-like element 464 is located at the longitudinal end 460 of the arm 458 while the other end of each strip-like element 464 is located at the longitudinal end 462 of the arm 458.

The end of each strip-like element 464 located at the longitudinal end 460 of the arm 458 is provided with a bearing component 466 in the form of a tube having a circular cross section. The longitudinal axes of the bearing components 466 lie on a common line which is perpendicular to the direction of elongation of the arm 458. At the longitudinal end 462 of the arm 458, the ends of the strip-like elements 464 are joined to one another by an abutment 468 which is again in the form of a tube having a circular cross section. The longitudinal axis of the abutment 468 is parallel to the longitudinal axes of the bearing components 466.

The two strip-like elements 464 are further joined to one another by a transverse strip-like element 470 which is shorter than the strip-like elements 464 and is located closer to the longitudinal end 460 of the arm 58 than to the longitudinal end 462. The transverse strip-like element 470 is provided with two openings which are spaced from one another transversely of the arm 458, and each of the openings receives a hook-like part 472 formed at one end of a tension spring or biasing element 474. The hook-like parts 472 anchor the springs 474 to the transverse strip-like element 470. Each of the springs 474 is provided with a second hook-like part 476 at an end of the respective spring 474 opposite the hook-like part 472.

A square or rectangular block 478 separate from the arm 458 is located between the two strip-like elements 464 of the arm 458. The block 478 is situated near the longitudinal end 460 of the arm 458 and is spaced from the transverse strip-like element 470. The block 478 has an edge which faces the transverse strip-like element 470 and a parallel edge which faces away from the strip-like element 470. The block 478 is provided with two openings in the vicinity of the edge which faces the transverse strip-like element 470, and the openings are spaced from one another transversely of the arm 458. Each of the openings in the block 478 receives the hook-like part 476 of one of the springs 474 to thereby anchor the respective spring 474 to the block 478.

The edge of the block 478 which faces away from the transverse strip-like element 470 is formed with a bearing component 480 in the form of a tube having a circular cross section. The longitudinal axis of the bearing component 480 lies on the same line as the longitudinal axes of the bearing components 466 of the arm 458, and the bearing components 466 and 480 are in register with one another. The bearing components 466 and 480 are designed to accommodate a pivot pin 482. When the pivot pin 482 is inserted in the bearing components 466 and 480, the block 478 will pivot together with the arm 458 unless prevented from doing so since the block 478 is connected to the arm 458 by way of the springs 474.

The strip-like elements 464 and 470 define a plane, and the abutment 468 on the arm 458 projects to one side of this plane while three teeth or protuberances 484 on the block 478 project to the opposite side of the plane. The teeth 484 are arranged in a row which extends transversely of the arm 458 and has a curvature.

As illustrated in FIG. 19, the support plate 258 has two opposite edges which respectively face the two reinforcing braces 260 within the circular frame 254 of the carrier 218. Each of these edges is located between two of the cross-beams 256, and a strip-shaped element 486 extends along each such edge and bridges the respective cross-beams 256. The strip-shaped elements 486 project upward from the support plate 258, and a L-shaped element 488 is connected to each of the strip-shaped elements 486. Each L-shaped element 488 has a pair of legs which are joined to one another by a crosspiece, and one leg of each L-shaped element 488 lies against and is fixed to the adjoining strip-shaped element 486. The other, free legs of the L-shaped elements 488 face one another and define a gap wide enough to receive the bearing components 466 and 480 of the arm 458 and the block 478. The pivot pin 482 is journaled in the bearing components 466 and 480, and also in the free legs of the L-shaped elements 488, to thereby pivotally mount the arm 458 and the block 478 on the support plate 258.

The arm 458 and the block 478 are situated to the rear of the center pivot 266 and project rearward from the support plate 258 within the confines of the circular frame 254. The abutment 468 on the arm 458 extends downward from the arm 458 whereas the teeth 484 on the block 478 project upward therefrom. Thus, the abutment 468 faces the ground and the teeth 484 face the platform 220.

Figure 22:
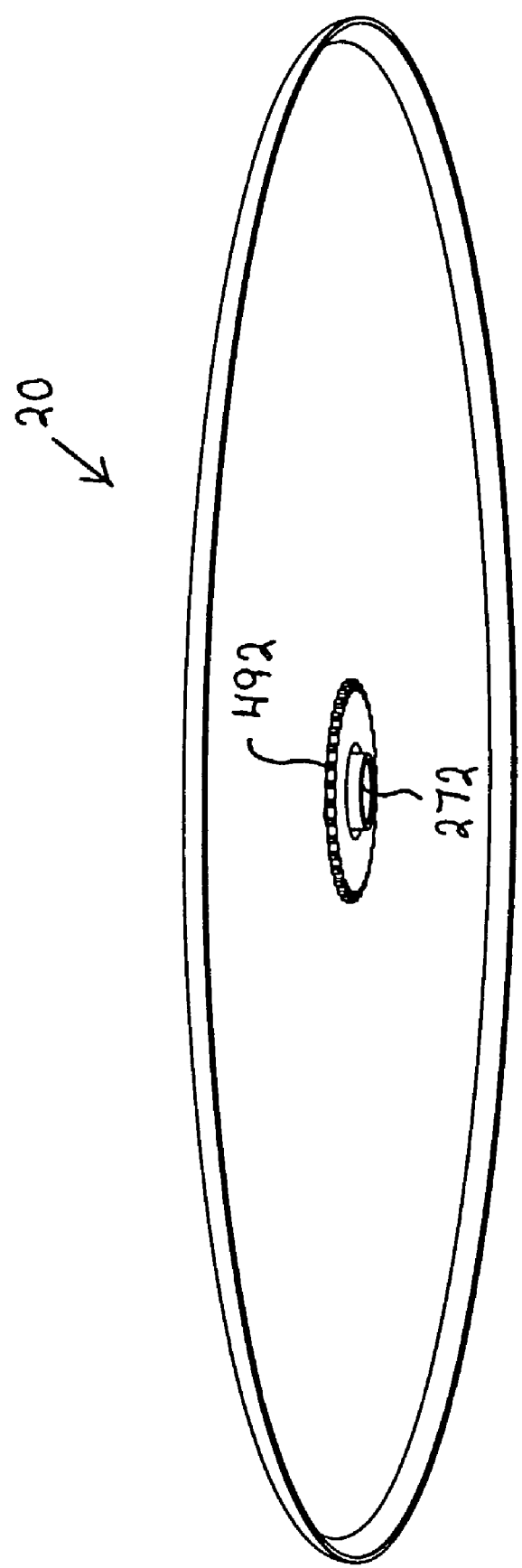
FIG. 22 is an enlarged bottom perspective view of a platform constituting part of the pallet positioner of FIG. 17.

Referring to FIG. 22, a gear or toothed element 490 is mounted on the underside and at the center of the platform 220. The gear 490 has a central opening, and a portion of the housing 272 welded to the platform 220 projects downward through such opening. The periphery of the gear 490 is provided with teeth or protuberances 492 which are capable of meshing with the teeth 484 on the block 478 to thus prevent the platform 220 from rotating. The teeth 484 on the block 478 and the teeth 492 on the gear 490 can be considered cooperating retaining members or portions for preventing rotation of the platform 220.

Figure 24A:
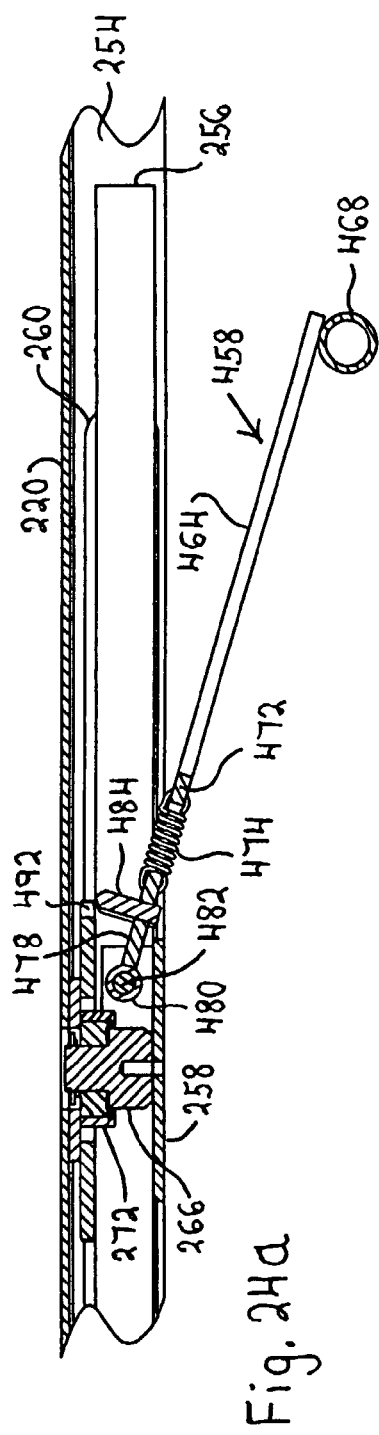
FIGS. 24a-24c are fragmentary sectioned views, taken along the line 24-24 of FIG. 17, illustrating the functioning of the braking member of FIG. 23.

One mode of operation of the pallet positioner 210 is as follows:

An operator depresses the "raise" button of the control element 456 to raise the platform assembly 212 to its uppermost position or maximum height. A pallet is placed on the platform 220 while the platform 220 is either in an elevated position or in its lowermost position, i.e., at its minimum height which is here ground level. When the platform assembly 212 is in its uppermost position, the arm 458 and the block 478 of the braking mechanism for the platform 220 are pivoted to an inoperative position as illustrated in FIG. 24a. In the inoperative position, the arm 458 is inclined to the horizontal such that the end of the arm 458 with the abutment 468 projects below the platform assembly 212, i.e., the arm 458 is inclined downwardly in a direction away from the pivot pin 482. The block 478 is inclined to the horizontal at the same angle as the arm 458 thereby causing the teeth 484 on the block 478 to be out of mesh with the teeth 492 on the bottom of the platform 220. Accordingly, the platform 220 is free to rotate.

While the platform assembly 212 is in its uppermost position, boxes are stacked on the pallet which was previously placed on the platform 220. During this operation, the platform 220 may be rotated to bring different areas of the pallet within the reach of the operator. Unlike the platform assembly 12 of the pallet positioner 10, the platform assembly 212 of the pallet positioner 210 does not move downward in response to increasing load. Thus, as boxes continue to be placed on the pallet, the loading height increases. In other words, the height or level at which a box must be positioned in order to load it onto the pallet increases. If the loading height becomes excessive, it is difficult for the operator to place additional boxes on the pallet.

To maintain a comfortable loading height, the operator depresses the "lower" button of the control element 456 to lower the platform assembly 212. Once the platform assembly 212 reaches a height where loading can again proceed comfortably, the operator releases the "lower" button to stop the descent of the platform assembly. The operator then begins to load additional boxes onto the pallet.

Loading of boxes onto the pallet and lowering of the platform assembly 212 are repeated as necessary for the proper stacking of boxes on the pallet. When the platform assembly 212 arrives at the level of the limit switch 448, the vertical leg 396 which rides on the mast 230 adjacent to the limit switch 448 throws or trips the switch 448. Upon throwing or tripping of the limit switch 448, the motor 418 driving the platform assembly 212 is deenergized and the platform assembly 212 stops even though the operator may be depressing the "lower" button of the control element 456. The automatic stopping of the platform assembly 212 advises the operator that the platform assembly 212 is approaching the level of the outriggers 216 and that the operator should keep her or his feet clear of the platform assembly 212. The operator is also given the opportunity to properly align the pallet on the platform assembly 212 if necessary.

In order to restart the descent of the platform assembly 212, the operator must again depress the "lower" button of the control element 456. However, the platform assembly 212 does not begin to move immediately when the "lower" button is depressed. Rather, the control element 456 sends a restart signal to the relays 428 and the timers 430, and the relays 428 and timers 430 then operate to cause a delay, e.g., a 3 second delay, from the time the "lower" button is depressed to the time the platform assembly 212 begins to move. The relays 428 and timers 430 further operate to activate the horn or buzzer 432 and the warning lights 434 during the delay. Following the delay, horn or buzzer 432 and the warning lights 434 continue in operation until the platform assembly 212 descends to its lowermost position at ground level and the operator releases the "lower" button.

As the platform assembly 212 approaches ground level, the abutment 468 on the arm 458 contacts the ground. After the abutment 468 comes into contact with the ground, continued downward movement of the platform assembly 212 causes the arm 458 to pivot relative to and approach the platform assembly 212. Since the block 478 with the teeth 484 is connected to the arm 458 via the springs 474, the block 478 moves with the arm 458 and likewise pivots towards the platform assembly 212 so that the teeth 484 come into mesh with the teeth 492 on the platform 220. This locks the platform 220 against rotation.

Figure 24B:
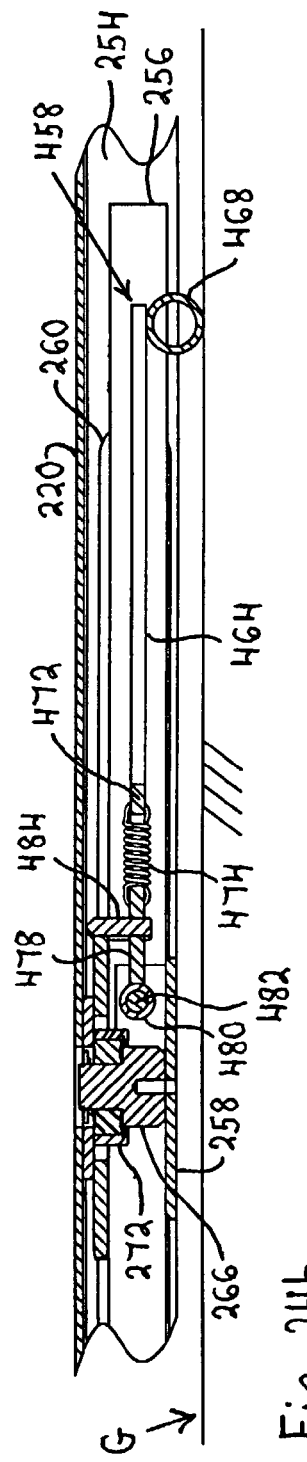
Figure 24C:
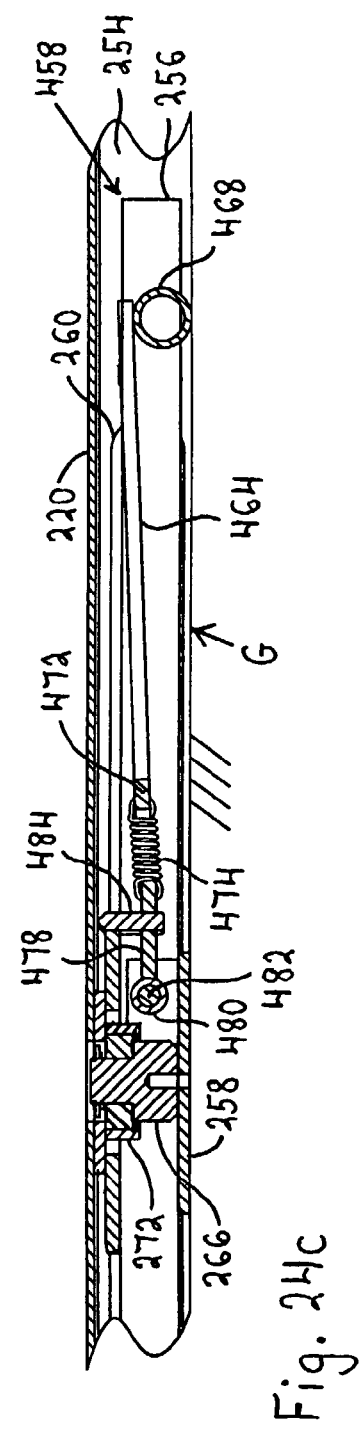

FIG. 24b shows the platform assembly 212 shortly before the platform assembly 212 reaches its lowermost position. Until now, the arm 458 and the block 478 have pivoted as a unit and both the arm 458 and block 478 are horizontally oriented. The teeth 484 on the block 478 are in mesh with the teeth 492 on the platform 220 and the upper ends of the teeth 484 abut the underside of the platform 220.

Since the upper ends of the teeth 484 abut the underside of the platform 220, the block 478 is no longer free to pivot as the platform assembly 212 moves downward. Thus, as the platform assembly 212 descends from the position of FIG. 24b to its lowermost position illustrated in FIG. 24c, the block 478 remains horizontal as it is carried downward by the platform assembly 212. On the other hand, the arm 458 is still free to pivot and, as the platform assembly 212 descends from the position of FIG. 24b to that of FIG. 24c, the arm 458 moves from a horizontal orientation to one in which the arm 458 is inclined upward in a direction away from the pivot pin 482. Hence, the arm 458 pivots relative to the block 478. Inasmuch as the arm 458 and the block 478 are connected to one another by the springs 474, the relative pivotal movement of the arm 458 and the block 478 places the springs 474 in tension. As a result, the teeth 484 on the block 478 are resiliently or elastically urged into mesh with the teeth 492 on the platform 220.

As the block 478 pivots towards the platform 220 during descent of the platform assembly 212, it may happen that the teeth 484 on the block 478 and the teeth 492 on the platform 220 are not aligned as necessary for the teeth 484 and the teeth 492 to mesh. Under such circumstances, the upper ends of the teeth 484 will abut the underside of the gear 490 formed with the teeth 492. When the teeth 484 abut the gear 490, the block 478 can no longer pivot as the platform assembly 212 moves downward. In contrast, the arm 458 is still able to pivot and, as the platform assembly 212 continues to descend, the arm 458 pivots relative to the block 478. Since the arm 458 and the block 478 are coupled to one another via the springs 474, the pivotal movement of the arm 458 in relation to the block 478 tensions the springs 474. Consequently, the block 478 is resiliently biased towards the platform 220. Should the platform 220 begin to rotate, the teeth 484 on the block 478 and the teeth 492 on the platform 220 will become aligned as required for meshing. The teeth 484 and the teeth 492 will thereupon come into mesh under the urging of the springs 474.

The automatic stopping of the platform assembly 12,212 during descent at a position above the lowermost position alerts the operator of the pallet positioner 10,210 that the platform assembly 12,212 is approaching the lowermost position. This gives the operator an opportunity to correct any misalignment of a pallet on the platform assembly 12,212 and warns the operator to keep her or his feet clear of the platform assembly 12,212. The automatic stopping of the platform assembly 12,212 thus increases the safety of the pallet positioner 10,210. In the pallet positioner 10,210, an additional measure of safety is achieved via the warning horn or buzzer 432 and the warning lights 434 which advise the operator that the platform assembly 212 is about to resume its downward movement.

The braking of the rotatable platform 20,220 in the lowermost position prevents the platform 20,220 from rotating while a pallet is being unloaded therefrom. This reduces the likelihood that the pallet will tip thereby further enhancing the safety of the pallet positioner 10,210. The resilient urging of the brake layer 158 against the platform 20, and the resilient urging of the teeth 484 into a meshing position with the teeth 492, reduce the chance that the braking action will be lessened by effects such as wear.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

We claim:

1. A load handling apparatus comprising:
   support means including an upwardly and downwardly extending support structure;
   a platform assembly movable up-and-down on said support structure between an uppermost position, a lowermost position and a substantially fixed intermediate position; and
   means for controlling movement of said platform assembly, said controlling means including means arranged to automatically stop downward movement of said platform assembly at said intermediate position each time said platform assembly descends from said uppermost position to said lowermost position.

2. The load handling apparatus of claim 1, wherein said controlling means comprises a hydraulic cylinder and said stopping means comprises means for interrupting the flow of hydraulic fluid into and out of said cylinder.

3. The load handling apparatus of claim 2, wherein said cylinder is provided with a flow passage for hydraulic fluid and said controlling means comprises a piston in said cylinder movable towards and away from said flow passage, said stopping means including a projection on said piston designed to block said flow passage.

4. The load handling apparatus of claim 1, wherein said controlling means comprises an electrical motor and said stopping means comprises means for deenergizing said motor.

5. The load handling apparatus of claim 4, wherein said deenergizing means comprises a limit switch.

6. The load handling apparatus of claim 1, wherein said controlling means comprises means for restarting downward movement of said platform assembly following arrival of said platform assembly at said intermediate position.

7. The load handling apparatus of claim 6, wherein said restarting means comprises means for generating a restart signal and said controlling means comprises means for causing a delay in movement of said platform assembly following the restart signal; and further comprising means for producing a warning during the delay.

8. The load handling apparatus of claim 7, wherein said producing means comprises means for generating a visual warning.

9. The load handling apparatus of claim 7, wherein said producing means comprises means for generating an audible warning.

10. The load handling apparatus of claim 1, wherein said platform assembly comprises a rotatable platform; and further comprising means for preventing rotation of said platform in said lowermost position.

11. The load handling apparatus of claim 10, wherein said preventing means comprises a friction element for frictionally engaging said platform, said friction element being mounted on said platform assembly for movement towards and away from said platform.

12. The load handling apparatus of claim 11, wherein said preventing means comprises means for urging said friction element against said platform.

13. The load handling apparatus of claim 12, wherein said preventing means comprises an abutment on said platform assembly below said friction element, said abutment being movable relative to said friction element between a first position at a first distance from said friction element and a second position at a smaller second distance from said friction element, and said urging means including a biasing element which acts on said abutment and on said friction element and is compressible in response to movement of said abutment from said first position to said second position.

14. The load handling apparatus of claim 10, wherein said preventing means comprises cooperating retaining portions which are relatively movable into and out of an operative position in which said retaining portions prevent rotation of said platform.

15. The load handling apparatus of claim 14, wherein said retaining portions comprise at least one first tooth and at least one second tooth which are relatively movable into and out of a meshing position, said second tooth projecting downward from and being rigid with said platform.

16. The load handling apparatus of claim 15, wherein said preventing means comprises means for urging said first tooth into said meshing position.

17. The load handling apparatus of claim 16, wherein said first tooth is pivotable on said platform assembly towards and away from said second tooth, said preventing means including an arm on said platform assembly below said platform, and said arm being discrete from and pivotable on a common axis with said first tooth, said arm being movable to and from a position in which said arm projects downward from said platform assembly, and said urging means including a biasing element which acts on said first tooth and on said arm.

18. The load handling apparatus of claim 1, wherein said controlling means comprises pneumatic self-leveling means designed to urge said platform assembly upwards.

19. The load handling apparatus of claim 1, wherein said support means comprises a pair of outriggers extending to one side of said support structure, said platform assembly being cantilevered from said support structure on said one side thereof.

20. The load handling apparatus of claim 19, further comprising a ramp connected to said outriggers.

21. The load handling apparatus of claim 1, wherein said controlling means comprises means for releasably locking said platform assembly in said lowermost position.

22. The load handling apparatus of claim 1, wherein said controlling means comprises a hydraulic cylinder, a piston reciprocable in said cylinder, a pulley connected to said piston, and an elongated force-transmitting element passing over said pulley, said force-transmitting element having one end which is fixed and another end which is connected to said platform assembly.

23. The load handling apparatus of claim 1, wherein said support structure comprises two substantially parallel guide columns.

24. A load handling apparatus comprising:
support means including an upwardly and downwardly extending support structure;
a platform assembly movable up-and-down on said support structure between an uppermost position and a lowermost position, said platform assembly including a rotatable platform;
means for controlling movement of said platform assembly; and
means for preventing rotation of said platform in said lowermost position, said preventing means including a retaining member for holding said platform against rotation and means for urging said retaining member towards said platform in said lowermost position with a spring action.

25. The load handling apparatus of claim 24, wherein said retaining member comprises a friction element for frictionally engaging said platform, said friction element being mounted on said platform assembly for movement towards and away from said platform.

26. The load handling apparatus of claim 25, wherein said preventing means comprises an abutment on said platform assembly below said friction element, said abutment being movable relative to said friction element between a first position at a first distance from said friction element and a second position at a smaller second distance from said friction element, said urging means including a biasing element which acts on said abutment and on said friction element and is compressible in response to movement of said abutment from said first position to said second position.

27. The load handling apparatus of claim 24, wherein said preventing means comprises an additional retaining member and said retaining members are relatively movable into and out of an operative position in which said retaining members prevent rotation of said platform.

28. The load handling apparatus of claim 27, wherein one of said retaining members comprises a first tooth and the other of said retaining members comprises a second tooth which projects downward from and is rigid with said platform, said first tooth and said second tooth being relatively movable into and out of a meshing position.

29. The load handling apparatus of claim 28, wherein said first tooth is pivotable on said platform assembly towards and away from said second tooth, said preventing means including an arm on said platform assembly below said platform, and said arm being discrete from and pivotable on a common axis with said first tooth, said arm being movable to and from a position in which said arm projects downward from said platform assembly, and said urging means including a biasing element which acts on said first tooth and on said arm.

30. The load handling apparatus of claim 24, wherein said controlling means comprises pneumatic self-leveling means designed to urge said platform assembly upwards.

31. The load handling apparatus of claim 24, wherein said support means comprises a pair of outriggers extending to one side of said support structure, said platform assembly being cantilevered from said support structure on said one side thereof.

32. The load handling apparatus of claim 31, further comprising a ramp connected to said outriggers.

33. The load handling apparatus of claim 24, wherein said controlling means comprises means for releasably locking said platform assembly in said lowermost position.

34. The load handling apparatus of claim 24, wherein said controlling means comprises a hydraulic cylinder, a piston reciprocable in said cylinder, a pulley connected to said piston, and an elongated force-transmitting element passing over said pulley, said force-transmitting element having one end which is fixed and another end which is connected to said platform assembly.

35. The load handling apparatus of claim 24, wherein said support structure comprises two substantially parallel guide columns.

36. A method of handling loads comprising the steps of:
raising a platform from a lowermost position to an elevated position;
placing a load on said platform while said platform is in said elevated position;
moving said platform from said elevated position to said lowermost position;
removing said load from said platform while said platform is in said lowermost position;
returning said platform to said elevated position;
repeating the raising, placing, moving, removing and returning steps; and
automatically stopping each moving step at a substantially fixed intermediate position between said elevated position and said lowermost position.

37. A method of handling a load comprising the steps of:
raising a platform from a lowermost position to an elevated position;
placing one part of said load on said platform while said platform is in said elevated position;
rotating said platform;
placing another part of said load on said platform following the rotating step;
returning said platform to said lowermost position; and
preventing rotation of said platform while said platform is in said lowermost position using a retaining member designed to hold said platform against rotation, the preventing step including urging said retaining member towards said platform with a spring action.

* * * * *

UNITED STATES PATENT AND TRADEMARK OFFICE
CERTIFICATE OF CORRECTION

PATENT NO.        : 7,604,452 B2                             Page 1 of 1
APPLICATION NO.   : 10/145426
DATED             : October 20, 2009
INVENTOR(S)       : Stone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this

Fifth Day of October, 2010

David J. Kappos
*Director of the United States Patent and Trademark Office*